United States Patent
Lee et al.

(10) Patent No.: US 11,528,755 B2
(45) Date of Patent: Dec. 13, 2022

(54) METHOD FOR PERFORMING ACCESS CONTROL AND DEVICE SUPPORTING THE SAME

(71) Applicant: LG ELECTRONICS INC., Seoul (KR)

(72) Inventors: Youngdae Lee, Seoul (KR); Sangwon Kim, Seoul (KR)

(73) Assignee: LG ELECTRONICS INC., Seoul (KR)

(*) Notice: Subject to any disclaimer, the term of this patent is extended or adjusted under 35 U.S.C. 154(b) by 0 days.

(21) Appl. No.: 16/972,245

(22) PCT Filed: Aug. 8, 2019

(86) PCT No.: PCT/KR2019/009986
§ 371 (c)(1),
(2) Date: Dec. 4, 2020

(87) PCT Pub. No.: WO2020/032628
PCT Pub. Date: Feb. 13, 2020

(65) Prior Publication Data
US 2021/0235512 A1 Jul. 29, 2021

(30) Foreign Application Priority Data
Aug. 10, 2018 (KR) .................. 10-2018-0093661

(51) Int. Cl.
*H04W 74/08* (2009.01)
*H04W 76/19* (2018.01)
(Continued)

(52) U.S. Cl.
CPC ....... *H04W 74/0875* (2013.01); *H04W 48/02* (2013.01); *H04W 48/16* (2013.01);
(Continued)

(58) Field of Classification Search
CPC . H04W 74/0875; H04W 48/02; H04W 48/16; H04W 68/005; H04W 74/0816;
(Continued)

(56) References Cited

U.S. PATENT DOCUMENTS

2017/0238342 A1* 8/2017 Yang .................... H04W 76/10
370/329
2020/0314895 A1* 10/2020 Bergström .......... H04W 74/006

FOREIGN PATENT DOCUMENTS

WO 2017043903 3/2017
WO 2017163185 9/2017

OTHER PUBLICATIONS

Bitar, Naim, et al. "On the coexistence of LTE-LAA in the unlicensed band: Modeling and performance analysis." IEEE Access 6 (2018): 52668-52681. (Year: 2018).*
(Continued)

*Primary Examiner* — Sharad Rampuria
(74) *Attorney, Agent, or Firm* — Lee Hong Degerman Kang Waimey

(57) ABSTRACT

Provided are a method of access control and a device supporting the method. According to an embodiment of the present disclosure, the method includes: selecting access information for an access to a cell; determining channel access priority class (CAPC) mapped to the selected access information; performing a listen-before-talk (LBT) procedure based on the CAPC; and transmitting an access request to the cell, when a result of the LBT is successful. According to another embodiment of the present disclosure, the method includes: determining channel access priority class (CAPC) mapped to a control message; performing a listen-before-talk (LBT) procedure based on the CAPC; and transmitting the control message, when a result of the LBT is successful.

8 Claims, 14 Drawing Sheets

(51) Int. Cl.
    *H04W 48/02*      (2009.01)
    *H04W 48/16*      (2009.01)
    *H04W 68/00*      (2009.01)
    *H04W 80/02*      (2009.01)

(52) U.S. Cl.
    CPC ..... *H04W 68/005* (2013.01); *H04W 74/0816* (2013.01); *H04W 76/19* (2018.02); *H04W 80/02* (2013.01)

(58) Field of Classification Search
    CPC . H04W 76/19; H04W 80/02; H04W 74/0808; H04W 72/04; H04W 72/12; H04W 76/00; H04B 7/2121; H04B 7/2123; H04J 2203/0069; H04Q 2213/394
    See application file for complete search history.

(56) References Cited

OTHER PUBLICATIONS

Maldonado, Roberto, Claudio Rosa, and Klaus I. Pedersen. "A fully coordinated new radio-unlicensed system for ultra-reliable low-latency applications." 2020 IEEE Wireless Communications and Networking Conference (WCNC). IEEE, 2020. (Year: 2020).*
MediaTek Inc., "Configured grant enhancements for NR-U," 3GPP TSG-RAN WG2 #103, R2-1812340, Aug. 2018, 5 pages.
Ericsson, "NR-U Channel access priority," 3GPP TSG-RAN WG2 #103, R2-1812373, Aug. 2018, 4 pages.
PCT International Application No. PCT/KR2019/009986, International Search Report dated Nov. 13, 2019, 2 pages.

* cited by examiner

METHOD FOR PERFORMING ACCESS CONTROL AND DEVICE SUPPORTING THE SAME

CROSS-REFERENCE TO RELATED APPLICATIONS

This application is the National Stage filing under 35 U.S.C. 371 of International Application No. PCT/KR2019/009986, filed on Aug. 8, 2019, which claims the benefit of earlier filing date and right of priority to Korean Application No. 10-2018-0093661, filed on Aug. 10, 2018, the contents of which are all incorporated by reference herein in their entirety.

TECHNICAL FIELD

The present invention relates to a wireless communication system, and more particularly, to a method for access control and a device supporting the same.

BACKGROUND

Efforts have been made to develop an improved $5^{th}$-generation (5G) communication system or a pre-5G communication system in order to satisfy a growing demand on radio data traffic after commercialization of a $4^{th}$-generation (4G) communication system. A standardization act for a 5G mobile communication standard work has been formally started in 3GPP, and there is ongoing discussion in a standardization working group under a tentative name of a new radio access (NR).

Meanwhile, an upper layer protocol defines a protocol state to consistently manage an operational state of a user equipment (UE), and indicates a function and procedure of the UE in detail. In the discussion on the NR standardization, an RRC state is discussed such that an RRC_CONNECTED state and an RRC_IDLE state are basically defined, and an RRC_INACTIVE state is additionally introduced.

Carrier aggregation with at least one SCell operating in the unlicensed spectrum is referred to as Licensed-Assisted Access (LAA). In LAA, the configured set of serving cells for a UE therefore always includes at least one SCell operating in the unlicensed spectrum according to Frame structure Type 3, also called LAA SCell. Unless otherwise specified, LAA SCells act as regular SCells.

LAA eNB and UE apply Listen-Before-Talk (LBT) before performing a transmission on LAA SCell. When LBT is applied, the transmitter listens to/senses the channel to determine whether the channel is free or busy. If the channel is determined to be free, the transmitter may perform the transmission; otherwise, it does not perform the transmission. If an LAA eNB uses channel access signals of other technologies for the purpose of LAA channel access, it shall continue to meet the LAA maximum energy detection threshold requirement.

Meanwhile, In NR-U, UE can stay in RRC_IDLE or RRC_INACTIVE on a cell in unlicensed band.

SUMMARY

According to a prior art, Channel Access Priority Class (CAPC) applies only for a logical channel, so it cannot distinguish different messages having different priorities carried on the same logical channel.

According to an embodiment of the present invention, a method performed by a wireless device in a wireless communication system is provided. The method may comprise: selecting access information for an access to a cell; determining channel access priority class (CAPC) mapped to the selected access information; performing a listen-before-talk (LBT) procedure based on the CAPC; and transmitting an access request to the cell, when a result of the LBT is successful.

The access information may be selected based on access type of the access to the cell.

The access information may include at least one of access class or cause value of access to the cell.

The method may further comprise: receiving a mapping table from the cell, and the mapping table may include information on relation between the CAPC and the access class, or between the CAPC and the cause value.

The performing the LBT procedure based on the CAPC may include scaling a time duration of carrier sensing based on the CAPC.

The performing the LBT procedure based on the CAPC may include scaling backoff time which is used when the result of the LBT procedure is not successful.

The method further comprise: performing access barring check of the access based on the selected access information.

The wireless device may communicate with at least one of a mobile terminal, a network or autonomous vehicles other than the wireless device.

According to another embodiment of the present invention, a method performed by a base station (BS) in a wireless communication system is provided. The method may comprise: determining channel access priority class (CAPC) mapped to a control message; performing a listen-before-talk (LBT) procedure based on the CAPC; and transmitting the control message, when a result of the LBT is successful.

The control message may include at least one of reference signal, a radio resource control (RRC) message, a non-access stratum (NAS) message, a F1AP message, a L2 control packet data unit (PDU) and a media access control (MAC) control element.

The reference signal may one of synchronization signal block (SSB) and channel state information (CSI)-reference signal (RS).

The RRC message may be one of system information (SI) message, master information block (MIB) message, system information block type1 (SIB1) message, paging message, RRC setup message, RRC resume message, and RRC re-establishment message.

The performing the LBT procedure based on the CAPC may include scaling a time duration of carrier sensing based on the CAPC.

the performing the LBT procedure based on the CAPC may include scaling backoff time which is used when the result of the LBT procedure is not successful.

According to another embodiment of the present invention, a processor for a wireless communication device in a wireless communication system is provided. The processor may be configured to control the wireless communication device to: select access information for an access to a cell; determine channel access priority class (CAPC) mapped to the selected access information; perform a listen-before-talk (LBT) procedure based on the CAPC; and transmitting an access request to the cell, when a result of the LBT is successful.

According to embodiments of the present invention, the LBT procedure may be performed based on CAPC, which is mapped to access type or control message. Therefore, priority of access and/or control message may be reflected on control plane when data transmission is occurred on unlicensed band.

DETAILED DESCRIPTION

The technical features described below may be used by a communication standard by the 3rd generation partnership project (3GPP) standardization organization, a communication standard by the institute of electrical and electronics engineers (IEEE), etc. For example, the communication standards by the 3GPP standardization organization include long-term evolution (LTE) and/or evolution of LTE systems. The evolution of LTE systems includes LTE-advanced (LTE-A), LTE-A Pro, and/or 5G new radio (NR). The communication standard by the IEEE standardization organization includes a wireless local area network (WLAN) system such as IEEE 802.11a/b/g/n/ac/ax. The above system uses various multiple access technologies such as orthogonal frequency division multiple access (OFDMA) and/or single carrier frequency division multiple access (SC-FDMA) for downlink (DL) and/or uplink (UL). For example, only OFDMA may be used for DL and only SC-FDMA may be used for UL. Alternatively, OFDMA and SC-FDMA may be used for DL and/or UL.

In this document, the term "/" and "," should be interpreted to indicate "and/or." For instance, the expression "A/B" may mean "A and/or B." Further, "A, B" may mean "A and/or B." Further, "A/B/C" may mean "at least one of A, B, and/or C." Also, "A, B, C" may mean "at least one of A, B, and/or C."

Further, in the document, the term "or" should be interpreted to indicate "and/or." For instance, the expression "A or B" may comprise 1) only A, 2) only B, and/or 3) both A and B. In other words, the term "or" in this document should be interpreted to indicate "additionally or alternatively."

Figure 1:
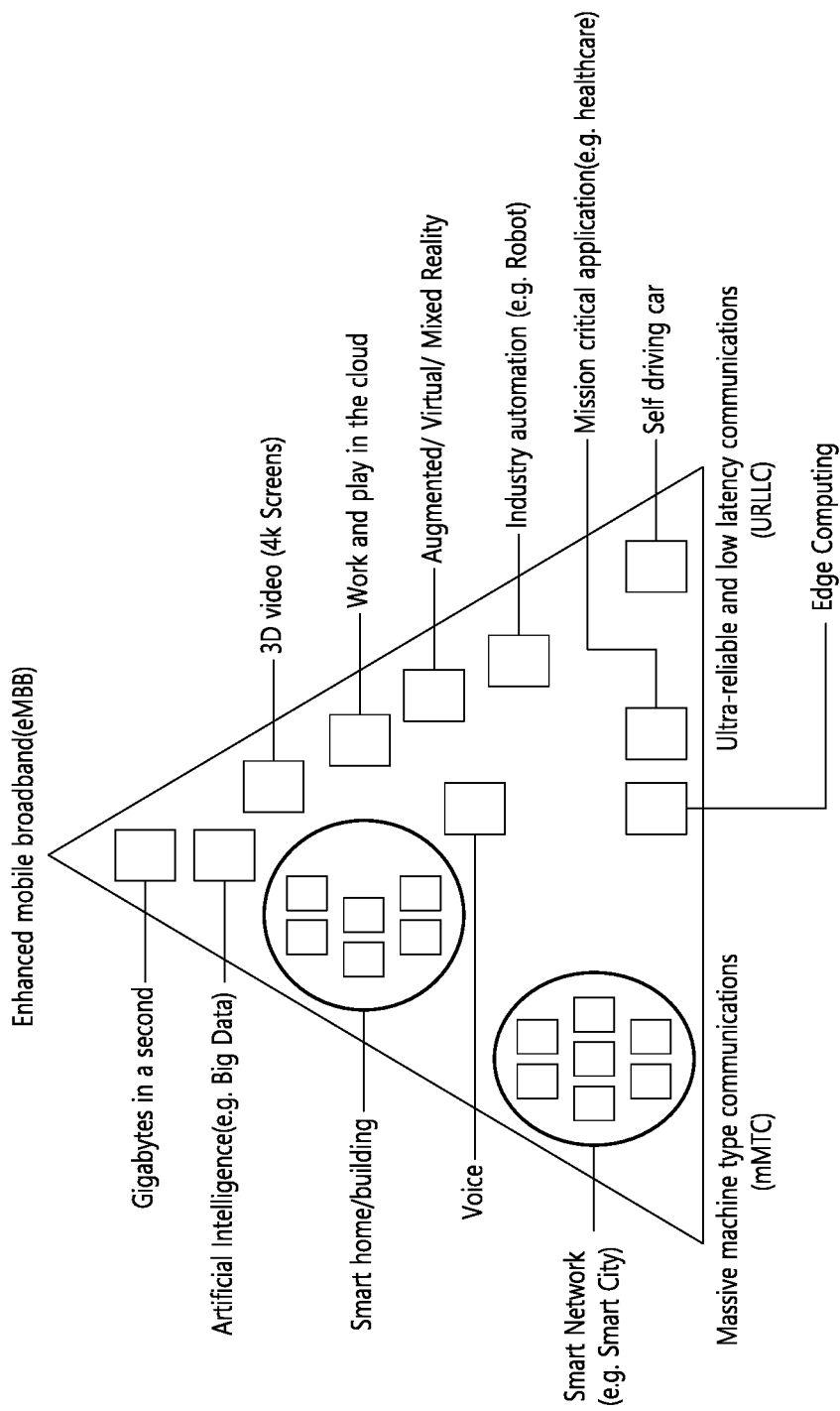
FIG. 1 shows examples of 5G usage scenarios to which the technical features of the present invention can be applied.

FIG. 1 shows examples of 5G usage scenarios to which the technical features of the present invention can be applied.

The 5G usage scenarios shown in FIG. 1 are only exemplary, and the technical features of the present invention can be applied to other 5G usage scenarios which are not shown in FIG. 1.

Referring to FIG. 1, the three main requirements areas of 5G include (1) enhanced mobile broadband (eMBB) domain, (2) massive machine type communication (mMTC) area, and (3) ultra-reliable and low latency communications (URLLC) area. Some use cases may require multiple areas for optimization and, other use cases may only focus on only one key performance indicator (KPI). 5G is to support these various use cases in a flexible and reliable way.

eMBB focuses on across-the-board enhancements to the data rate, latency, user density, capacity and coverage of mobile broadband access. The eMBB aims ~10 Gbps of throughput. eMBB far surpasses basic mobile Internet access and covers rich interactive work and media and entertainment applications in cloud and/or augmented reality. Data is one of the key drivers of 5G and may not be able to see dedicated voice services for the first time in the 5G era. In 5G, the voice is expected to be processed as an application simply using the data connection provided by the communication system. The main reason for the increased volume of traffic is an increase in the size of the content and an increase in the number of applications requiring high data rates. Streaming services (audio and video), interactive video and mobile Internet connectivity will become more common as more devices connect to the Internet. Many of these applications require always-on connectivity to push real-time information and notifications to the user. Cloud storage and applications are growing rapidly in mobile communication platforms, which can be applied to both work and entertainment. Cloud storage is a special use case that drives growth of uplink data rate. 5G is also used for remote tasks on the cloud and requires much lower end-to-end delay to maintain a good user experience when the tactile interface is used. In entertainment, for example, cloud games and video streaming are another key factor that increases the demand for mobile broadband capabilities. Entertainment is essential in smartphones and tablets anywhere, including high mobility environments such as trains, cars and airplanes. Another use case is augmented reality and information retrieval for entertainment. Here, augmented reality requires very low latency and instantaneous data amount.

mMTC is designed to enable communication between devices that are low-cost, massive in number and battery-driven, intended to support applications such as smart metering, logistics, and field and body sensors. mMTC aims ~10 years on battery and/or ~1 million devices/km2. mMTC allows seamless integration of embedded sensors in all areas and is one of the most widely used 5G applications. Potentially by 2020, internet-of-things (IoT) devices are expected to reach 20.4 billion. Industrial IoT is one of the areas where 5G plays a key role in enabling smart cities, asset tracking, smart utilities, agriculture and security infrastructures.

URLLC will make it possible for devices and machines to communicate with ultra-reliability, very low latency and high availability, making it ideal for vehicular communication, industrial control, factory automation, remote surgery, smart grids and public safety applications. URLLC aims ~1 ms of latency. URLLC includes new services that will change the industry through links with ultra-reliability/low latency, such as remote control of key infrastructure and self-driving vehicles. The level of reliability and latency is essential for smart grid control, industrial automation, robotics, drones control and coordination.

Next, a plurality of use cases included in the triangle of FIG. 1 will be described in more detail.

5G can complement fiber-to-the-home (FTTH) and cable-based broadband (or DOCSIS) as a means of delivering streams rated from hundreds of megabits per second to gigabits per second. This high speed can be required to deliver TVs with resolutions of 4K or more (6K, 8K and above) as well as virtual reality (VR) and augmented reality (AR). VR and AR applications include mostly immersive sporting events. Certain applications may require special network settings. For example, in the case of a VR game, a game company may need to integrate a core server with an edge network server of a network operator to minimize delay.

Automotive is expected to become an important new driver for 5G, with many use cases for mobile communications to vehicles. For example, entertainment for passengers demands high capacity and high mobile broadband at the same time. This is because future users will continue to expect high-quality connections regardless of their location and speed. Another use case in the automotive sector is an augmented reality dashboard. The driver can identify an object in the dark on top of what is being viewed through the front window through the augmented reality dashboard. The augmented reality dashboard displays information that will inform the driver about the object's distance and movement. In the future, the wireless module enables communication between vehicles, information exchange between the vehicle and the supporting infrastructure, and information exchange between the vehicle and other connected devices (e.g. devices accompanied by a pedestrian). The safety system allows the driver to guide the alternative course of action so that he can drive more safely, thereby reducing the risk of accidents. The next step will be a remotely controlled vehicle or self-driving vehicle. This requires a very reliable and very fast communication between different self-driving vehicles and between vehicles and infrastructure. In the future, a self-driving vehicle will perform all driving activities, and the driver will focus only on traffic that the vehicle itself cannot identify. The technical requirements of self-driving vehicles require ultra-low latency and high-speed reliability to increase traffic safety to a level not achievable by humans.

Smart cities and smart homes, which are referred to as smart societies, will be embedded in high density wireless sensor networks. The distributed network of intelligent sensors will identify conditions for cost and energy-efficient maintenance of a city or house. A similar setting can be performed for each home. Temperature sensors, windows and heating controllers, burglar alarms and appliances are all wirelessly connected. Many of these sensors typically require low data rate, low power and low cost. However, for example, real-time high-definition (HD) video may be required for certain types of devices for monitoring.

The consumption and distribution of energy, including heat or gas, is highly dispersed, requiring automated control of distributed sensor networks. The smart grid interconnects these sensors using digital information and communication technologies to collect and act on information. This information can include supplier and consumer behavior, allowing the smart grid to improve the distribution of fuel, such as electricity, in terms of efficiency, reliability, economy, production sustainability, and automated methods. The smart grid can be viewed as another sensor network with low latency.

The health sector has many applications that can benefit from mobile communications. Communication systems can support telemedicine to provide clinical care in remote locations. This can help to reduce barriers to distance and improve access to health services that are not continuously available in distant rural areas. It is also used to save lives in critical care and emergency situations. Mobile communication based wireless sensor networks can provide remote monitoring and sensors for parameters such as heart rate and blood pressure.

Wireless and mobile communications are becoming increasingly important in industrial applications. Wiring costs are high for installation and maintenance. Thus, the possibility of replacing a cable with a wireless link that can be reconfigured is an attractive opportunity in many industries. However, achieving this requires that wireless connections operate with similar delay, reliability, and capacity as cables and that their management is simplified. Low latency and very low error probabilities are new requirements that need to be connected to 5G.

Logistics and freight tracking are important use cases of mobile communications that enable tracking of inventory and packages anywhere using location based information systems. Use cases of logistics and freight tracking typically require low data rates, but require a large range and reliable location information.

Figure 2:
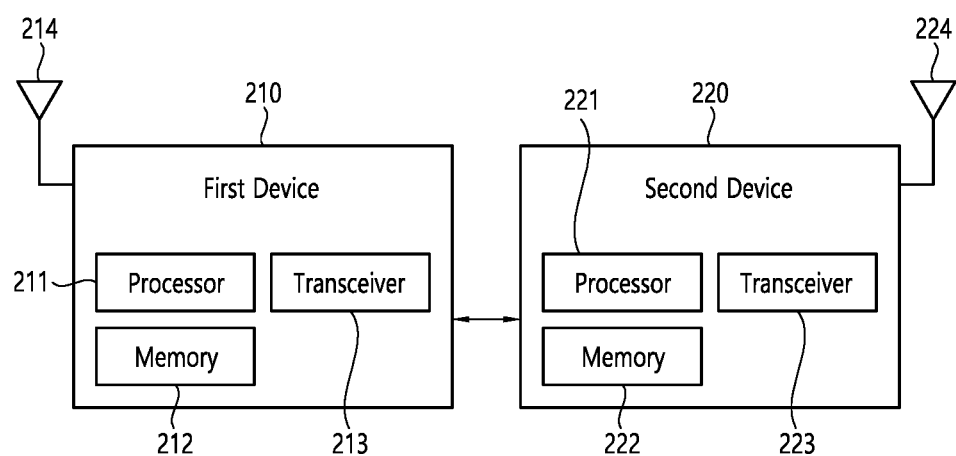
FIG. 2 shows an example of a wireless communication system to which the technical features of the present invention can be applied.

FIG. 2 shows an example of a wireless communication system to which the technical features of the present invention can be applied.

Referring to FIG. 2, the wireless communication system may include a first device 210 and a second device 220.

The first device 210 includes a base station, a network node, a transmitting UE, a receiving UE, a wireless device, a wireless communication device, a vehicle, a vehicle equipped with an autonomous driving function, a connected car, a drone, an unmanned aerial vehicle (UAV), an artificial intelligence (AI) module, a robot, an AR device, a VR device, a mixed reality (MR) device, a hologram device, a public safety device, an MTC device, an IoT device, a medical device, a fin-tech device (or, a financial device), a security device, a climate/environmental device, a device related to 5G services, or a device related to the fourth industrial revolution.

The second device 220 includes a base station, a network node, a transmitting UE, a receiving UE, a wireless device, a wireless communication device, a vehicle, a vehicle equipped with an autonomous driving function, a connected car, a drone, a UAV, an AI module, a robot, an AR device, a VR device, an MR device, a hologram device, a public safety device, an MTC device, an IoT device, a medical device, a fin-tech device (or, a financial device), a security device, a climate/environmental device, a device related to 5G services, or a device related to the fourth industrial revolution.

For example, the UE may include a mobile phone, a smart phone, a laptop computer, a digital broadcasting terminal, a personal digital assistant (PDA), a portable multimedia player (PMP), a navigation device, a slate personal computer (PC), a tablet PC, an ultrabook, a wearable device (e.g. a smartwatch, a smart glass, a head mounted display (HMD)). For example, the HMD may be a display device worn on the head. For example, the HMD may be used to implement AR, VR and/or MR.

For example, the drone may be a flying object that is flying by a radio control signal without a person boarding it. For example, the VR device may include a device that implements an object or background in the virtual world. For example, the AR device may include a device that implements connection of an object and/or a background of a virtual world to an object and/or a background of the real world. For example, the MR device may include a device that implements fusion of an object and/or a background of a virtual world to an object and/or a background of the real world. For example, the hologram device may include a device that implements a 360-degree stereoscopic image by recording and playing stereoscopic information by utilizing a phenomenon of interference of light generated by the two laser lights meeting with each other, called holography. For example, the public safety device may include a video relay device or a video device that can be worn by the user's body. For example, the MTC device and the IoT device may be a device that do not require direct human intervention or manipulation. For example, the MTC device and the IoT device may include a smart meter, a vending machine, a thermometer, a smart bulb, a door lock and/or various sensors. For example, the medical device may be a device used for the purpose of diagnosing, treating, alleviating, handling, or preventing a disease. For example, the medical device may be a device used for the purpose of diagnosing, treating, alleviating, or correcting an injury or disorder. For example, the medical device may be a device used for the purpose of inspecting, replacing or modifying a structure or function. For example, the medical device may be a device used for the purpose of controlling pregnancy. For example, the medical device may include a treatment device, a surgical device, an (in vitro) diagnostic device, a hearing aid and/or a procedural device, etc. For example, a security device may be a device installed to prevent the risk that may occur and to maintain safety. For example, the security device may include a camera, a closed-circuit TV (CCTV), a recorder, or a black box. For example, the fin-tech device may be a device capable of providing financial services such as mobile payment. For example, the fin-tech device may include a payment device or a point of sales (POS). For example, the climate/environmental device may include a device for monitoring or predicting the climate/environment.

The first device 210 may include at least one or more processors, such as a processor 211, at least one memory, such as a memory 212, and at least one transceiver, such as a transceiver 213. The processor 211 may perform the functions, procedures, and/or methods of the present invention described below. The processor 211 may perform one or more protocols. For example, the processor 211 may perform one or more layers of the air interface protocol. The memory 212 is connected to the processor 211 and may store various types of information and/or instructions. The transceiver 213 is connected to the processor 211 and may be controlled to transmit and receive wireless signals.

The second device 220 may include at least one or more processors, such as a processor 221, at least one memory, such as a memory 222, and at least one transceiver, such as a transceiver 223. The processor 221 may perform the functions, procedures, and/or methods of the present invention described below. The processor 221 may perform one or more protocols. For example, the processor 221 may perform one or more layers of the air interface protocol. The memory 222 is connected to the processor 221 and may store various types of information and/or instructions. The transceiver 223 is connected to the processor 221 and may be controlled to transmit and receive wireless signals.

The memory 212, 222 may be connected internally or externally to the processor 211, 212, or may be connected to other processors via a variety of technologies such as wired or wireless connections.

The first device 210 and/or the second device 220 may have more than one antenna. For example, antenna 214 and/or antenna 224 may be configured to transmit and receive wireless signals.

Figure 3:
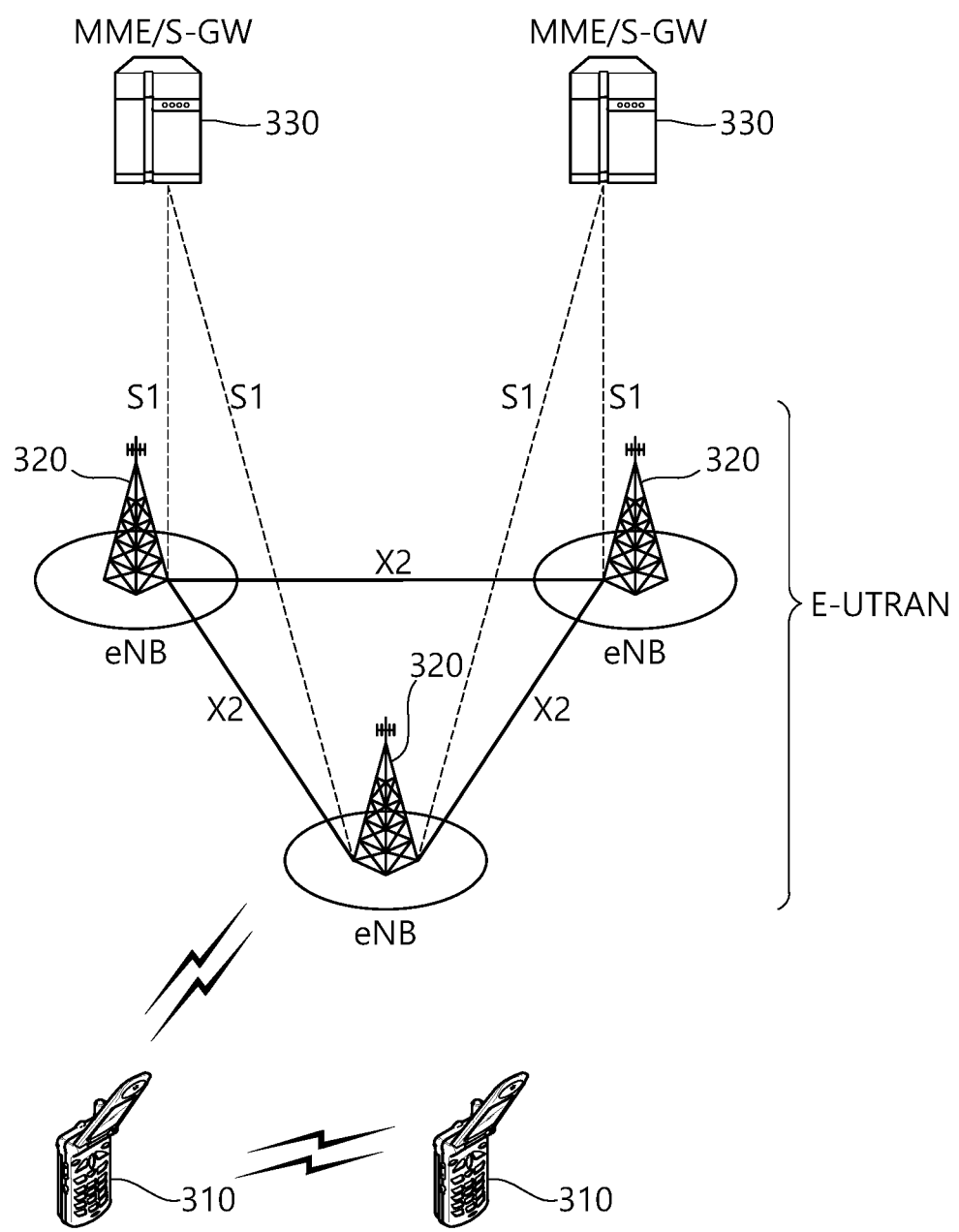
FIG. 3 shows an example of a wireless communication system to which the technical features of the present invention can be applied.

FIG. 3 shows an example of a wireless communication system to which the technical features of the present invention can be applied.

Specifically, FIG. 3 shows a system architecture based on an evolved-UMTS terrestrial radio access network (E-UTRAN). The aforementioned LTE is a part of an evolved-UTMS (e-UMTS) using the E-UTRAN.

Referring to FIG. 3, the wireless communication system includes one or more user equipment (UE) 310, an E-UTRAN and an evolved packet core (EPC). The UE 310 refers to a communication equipment carried by a user. The UE 310 may be fixed or mobile. The UE 310 may be referred to as another terminology, such as a mobile station (MS), a user terminal (UT), a subscriber station (SS), a wireless device, etc.

The E-UTRAN consists of one or more evolved NodeB (eNB) 320. The eNB 320 provides the E-UTRA user plane and control plane protocol terminations towards the UE 10. The eNB 320 is generally a fixed station that communicates with the UE 310. The eNB 320 hosts the functions, such as inter-cell radio resource management (RRM), radio bearer (RB) control, connection mobility control, radio admission control, measurement configuration/provision, dynamic resource allocation (scheduler), etc. The eNB 320 may be referred to as another terminology, such as a base station (BS), a base transceiver system (BTS), an access point (AP), etc.

A downlink (DL) denotes communication from the eNB 320 to the UE 310. An uplink (UL) denotes communication from the UE 310 to the eNB 320. A sidelink (SL) denotes communication between the UEs 310. In the DL, a transmitter may be a part of the eNB 320, and a receiver may be a part of the UE 310. In the UL, the transmitter may be a part of the UE 310, and the receiver may be a part of the eNB 320. In the SL, the transmitter and receiver may be a part of the UE 310.

The EPC includes a mobility management entity (MME), a serving gateway (S-GW) and a packet data network (PDN) gateway (P-GW). The MME hosts the functions, such as non-access stratum (NAS) security, idle state mobility handling, evolved packet system (EPS) bearer control, etc. The S-GW hosts the functions, such as mobility anchoring, etc. The S-GW is a gateway having an E-UTRAN as an endpoint. For convenience, MME/S-GW 330 will be referred to herein simply as a "gateway," but it is understood that this entity includes both the MME and S-GW. The P-GW hosts the functions, such as UE Internet protocol (IP) address allocation, packet filtering, etc. The P-GW is a gateway having a PDN as an endpoint. The P-GW is connected to an external network.

The UE 310 is connected to the eNB 320 by means of the Uu interface. The UEs 310 are interconnected with each other by means of the PC5 interface. The eNBs 320 are interconnected with each other by means of the X2 interface. The eNBs 320 are also connected by means of the S1 interface to the EPC, more specifically to the MME by means of the S1-MME interface and to the S-GW by means of the S1-U interface. The S1 interface supports a many-to-many relation between MMEs/S-GWs and eNBs.

Figure 4:
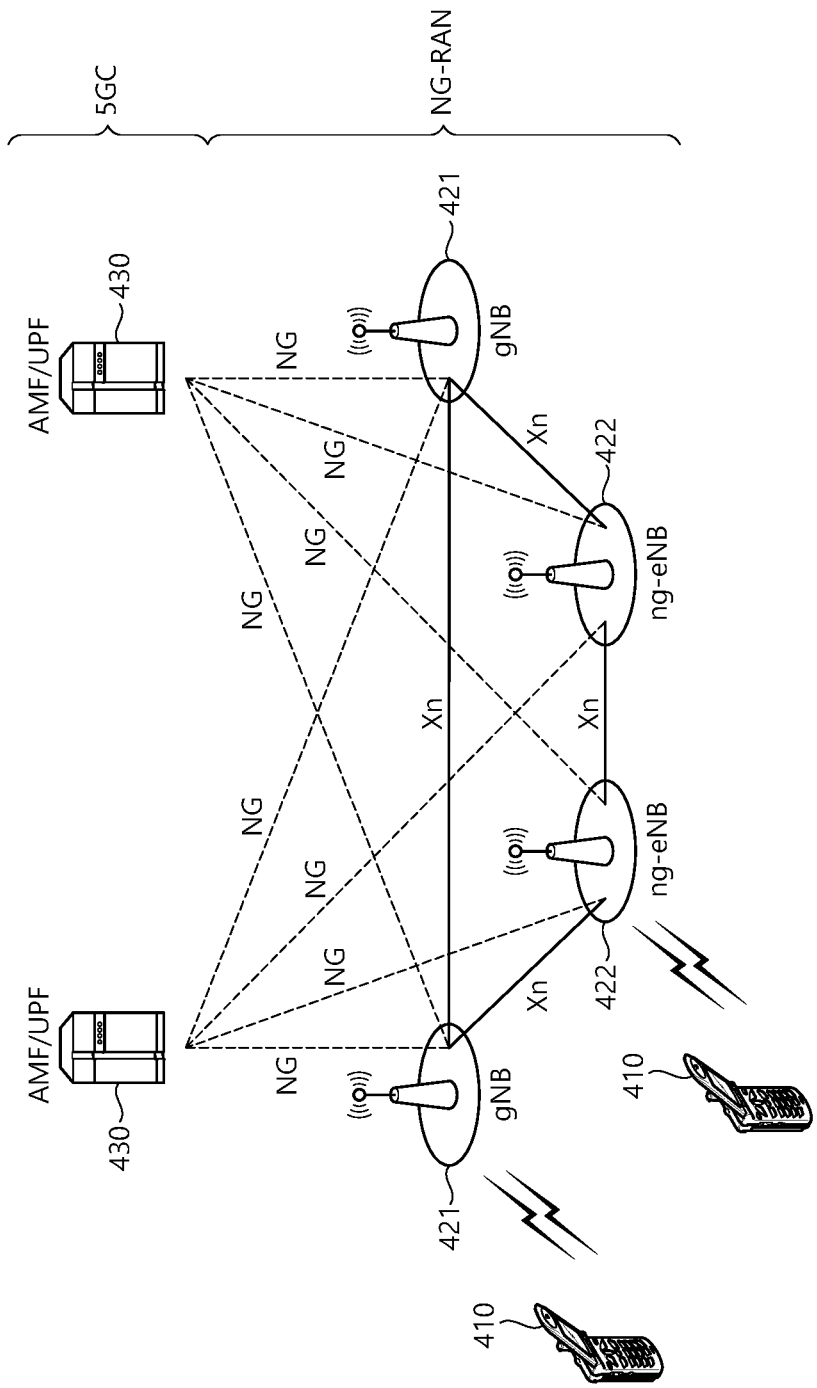
FIG. 4 shows another example of a wireless communication system to which the technical features of the present invention can be applied.

FIG. 4 shows another example of a wireless communication system to which the technical features of the present invention can be applied.

Specifically, FIG. 4 shows a system architecture based on a 5G NR. The entity used in the 5G NR (hereinafter, simply referred to as "NR") may absorb some or all of the functions of the entities introduced in FIG. 3 (e.g. eNB, MME, S-GW). The entity used in the NR may be identified by the name "NG" for distinction from the LTE/LTE-A.

Referring to FIG. 4, the wireless communication system includes one or more UE 410, a next-generation RAN (NG-RAN) and a 5th generation core network (5GC). The NG-RAN consists of at least one NG-RAN node. The NG-RAN node is an entity corresponding to the eNB 320 shown in FIG. 3. The NG-RAN node consists of at least one gNB 421 and/or at least one ng-eNB 422. The gNB 421 provides NR user plane and control plane protocol terminations towards the UE 410. The ng-eNB 422 provides E-UTRA user plane and control plane protocol terminations towards the UE 410.

The 5GC includes an access and mobility management function (AMF), a user plane function (UPF) and a session management function (SMF). The AMF hosts the functions, such as NAS security, idle state mobility handling, etc. The AMF is an entity including the functions of the conventional MME. The UPF hosts the functions, such as mobility anchoring, protocol data unit (PDU) handling. The UPF an entity including the functions of the conventional S-GW. The SMF hosts the functions, such as UE IP address allocation, PDU session control.

The gNBs 421 and ng-eNBs 422 are interconnected with each other by means of the Xn interface. The gNBs 421 and ng-eNBs 422 are also connected by means of the NG interfaces to the 5GC, more specifically to the AMF by means of the NG-C interface and to the UPF by means of the NG-U interface.

A protocol structure between network entities described above is described. On the system of FIG. 3 and/or FIG. 4, layers of a radio interface protocol between the UE and the network (e.g. NG-RAN and/or E-UTRAN) may be classified into a first layer (L1), a second layer (L2), and a third layer (L3) based on the lower three layers of the open system interconnection (OSI) model that is well-known in the communication system.

Figure 5:
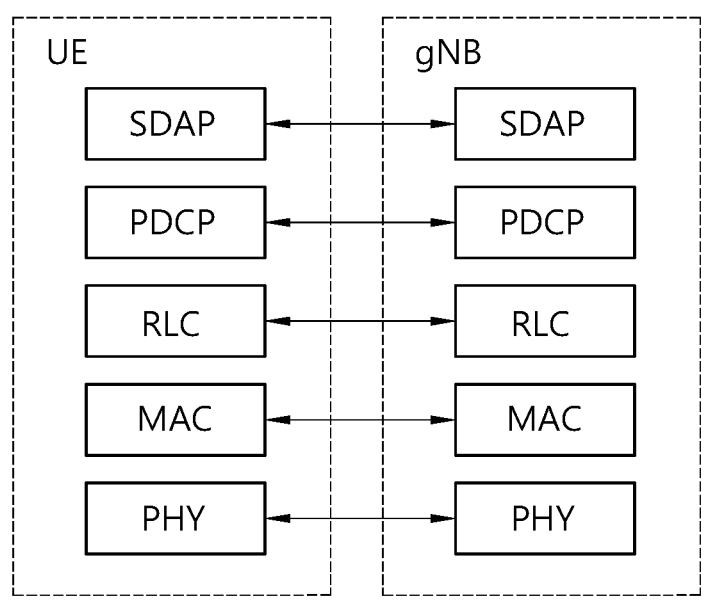
FIG. 5 shows a block diagram of a user plane protocol stack to which the technical features of the present invention can be applied.
Figure 6:
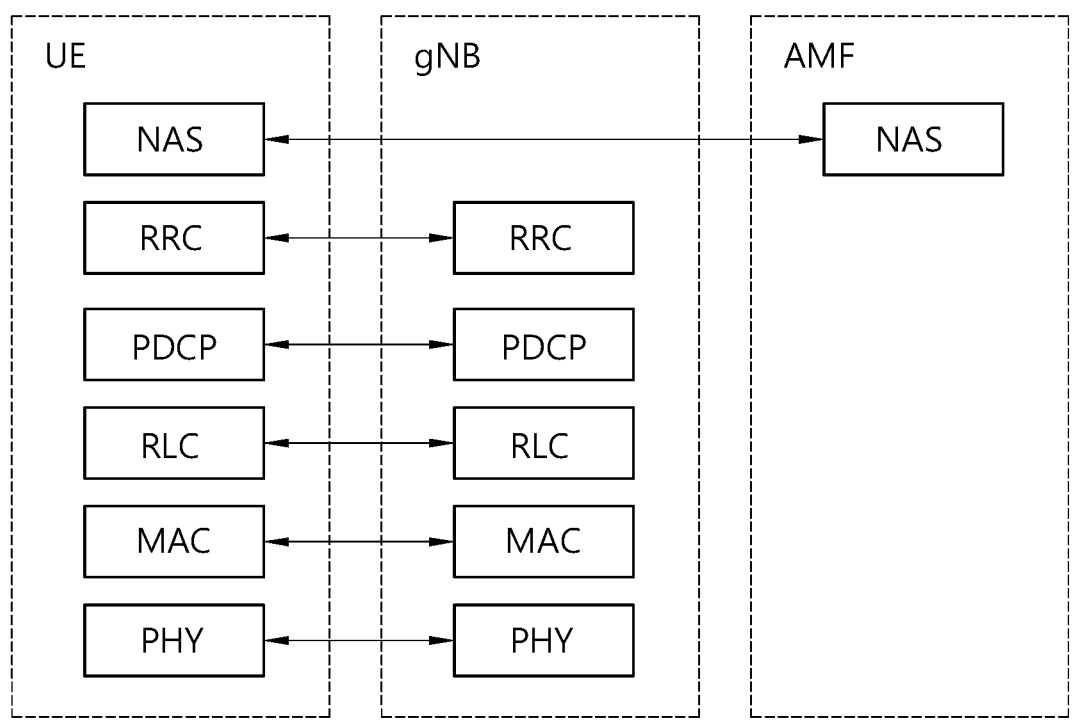
FIG. 6 shows a block diagram of a control plane protocol stack to which the technical features of the present invention can be applied.

FIG. 5 shows a block diagram of a user plane protocol stack to which the technical features of the present invention can be applied. FIG. 6 shows a block diagram of a control plane protocol stack to which the technical features of the present invention can be applied.

The user/control plane protocol stacks shown in FIG. 5 and FIG. 6 are used in NR. However, user/control plane protocol stacks shown in FIG. 5 and FIG. 6 may be used in LTE/LTE-A without loss of generality, by replacing gNB/AMF with eNB/MME.

Referring to FIG. 5 and FIG. 6, a physical (PHY) layer belonging to L1. The PHY layer offers information transfer services to media access control (MAC) sublayer and higher layers. The PHY layer offers to the MAC sublayer transport channels. Data between the MAC sublayer and the PHY layer is transferred via the transport channels. Between different PHY layers, i.e., between a PHY layer of a transmission side and a PHY layer of a reception side, data is transferred via the physical channels.

The MAC sublayer belongs to L2. The main services and functions of the MAC sublayer include mapping between logical channels and transport channels, multiplexing/demultiplexing of MAC service data units (SDUs) belonging to one or different logical channels into/from transport blocks (TB) delivered to/from the physical layer on transport channels, scheduling information reporting, error correction through hybrid automatic repeat request (HARQ), priority handling between UEs by means of dynamic scheduling, priority handling between logical channels of one UE by means of logical channel prioritization (LCP), etc. The MAC sublayer offers to the radio link control (RLC) sublayer logical channels.

The RLC sublayer belong to L2. The RLC sublayer supports three transmission modes, i.e. transparent mode (TM), unacknowledged mode (UM), and acknowledged mode (AM), in order to guarantee various quality of services (QoS) required by radio bearers. The main services and functions of the RLC sublayer depend on the transmission mode. For example, the RLC sublayer provides transfer of upper layer PDUs for all three modes, but provides error correction through ARQ for AM only. In LTE/LTE-A, the RLC sublayer provides concatenation, segmentation and reassembly of RLC SDUs (only for UM and AM data transfer) and re-segmentation of RLC data PDUs (only for AM data transfer). In NR, the RLC sublayer provides segmentation (only for AM and UM) and re-segmentation (only for AM) of RLC SDUs and reassembly of SDU (only for AM and UM). That is, the NR does not support concatenation of RLC SDUs. The RLC sublayer offers to the packet data convergence protocol (PDCP) sublayer RLC channels.

The PDCP sublayer belong to L2. The main services and functions of the PDCP sublayer for the user plane include header compression and decompression, transfer of user data, duplicate detection, PDCP PDU routing, retransmission of PDCP SDUs, ciphering and deciphering, etc. The main services and functions of the PDCP sublayer for the control plane include ciphering and integrity protection, transfer of control plane data, etc.

The service data adaptation protocol (SDAP) sublayer belong to L2. The SDAP sublayer is only defined in the user plane. The SDAP sublayer is only defined for NR. The main services and functions of SDAP include, mapping between a QoS flow and a data radio bearer (DRB), and marking QoS flow ID (QFI) in both DL and UL packets. The SDAP sublayer offers to 5GC QoS flows.

A radio resource control (RRC) layer belongs to L3. The RRC layer is only defined in the control plane. The RRC layer controls radio resources between the UE and the network. To this end, the RRC layer exchanges RRC messages between the UE and the BS. The main services and functions of the RRC layer include broadcast of system information related to AS and NAS, paging, establishment, maintenance and release of an RRC connection between the UE and the network, security functions including key management, establishment, configuration, maintenance and release of radio bearers, mobility functions, QoS management functions, UE measurement reporting and control of the reporting, NAS message transfer to/from NAS from/to UE.

In other words, the RRC layer controls logical channels, transport channels, and physical channels in relation to the configuration, reconfiguration, and release of radio bearers. A radio bearer refers to a logical path provided by L1 (PHY layer) and L2 (MAC/RLC/PDCP/SDAP sublayer) for data transmission between a UE and a network. Setting the radio bearer means defining the characteristics of the radio protocol layer and the channel for providing a specific service, and setting each specific parameter and operation method. Radio bearer may be divided into signaling RB (SRB) and data RB (DRB). The SRB is used as a path for transmitting RRC messages in the control plane, and the DRB is used as a path for transmitting user data in the user plane.

An RRC state indicates whether an RRC layer of the UE is logically connected to an RRC layer of the E-UTRAN. In LTE/LTE-A, when the RRC connection is established between the RRC layer of the UE and the RRC layer of the E-UTRAN, the UE is in the RRC connected state (RRC_CONNECTED). Otherwise, the UE is in the RRC idle state (RRC_IDLE). In NR, the RRC inactive state (RRC_INACTIVE) is additionally introduced. RRC_INACTIVE may be used for various purposes. For example, the massive machine type communications (MMTC) UEs can be efficiently managed in RRC_INACTIVE. When a specific condition is satisfied, transition is made from one of the above three states to the other.

A predetermined operation may be performed according to the RRC state. In RRC_IDLE, public land mobile network (PLMN) selection, broadcast of system information (SI), cell re-selection mobility, core network (CN) paging and discontinuous reception (DRX) configured by NAS may be performed. The UE shall have been allocated an identifier (ID) which uniquely identifies the UE in a tracking area. No RRC context stored in the BS.

In RRC_CONNECTED, the UE has an RRC connection with the network (i.e. E-UTRAN/NG-RAN). Network-CN connection (both C/U-planes) is also established for UE. The UE AS context is stored in the network and the UE. The RAN knows the cell which the UE belongs to. The network can transmit and/or receive data to/from UE. Network controlled mobility including measurement is also performed.

Most of operations performed in RRC_IDLE may be performed in RRC_INACTIVE. But, instead of CN paging in RRC_IDLE, RAN paging is performed in RRC_INACTIVE. In other words, in RRC_IDLE, paging for mobile terminated (MT) data is initiated by core network and paging area is managed by core network. In RRC_INACTIVE, paging is initiated by NG-RAN, and RAN-based notification area (RNA) is managed by NG-RAN. Further, instead of DRX for CN paging configured by NAS in RRC_IDLE, DRX for RAN paging is configured by NG-RAN in RRC_INACTIVE. Meanwhile, in RRC_INACTIVE, 5GC-NG-RAN connection (both C/U-planes) is established for UE, and the UE AS context is stored in NG-RAN and the UE. NG-RAN knows the RNA which the UE belongs to.

NAS layer is located at the top of the RRC layer. The NAS control protocol performs the functions, such as authentication, mobility management, security control.

The physical channels may be modulated according to OFDM processing and utilizes time and frequency as radio resources. The physical channels consist of a plurality of orthogonal frequency division multiplexing (OFDM) symbols in time domain and a plurality of subcarriers in frequency domain. One subframe consists of a plurality of OFDM symbols in the time domain. A resource block is a resource allocation unit, and consists of a plurality of OFDM symbols and a plurality of subcarriers. In addition, each subframe may use specific subcarriers of specific OFDM symbols (e.g. first OFDM symbol) of the corresponding subframe for a physical downlink control channel (PDCCH), i.e. L1/L2 control channel. A transmission time interval (TTI) is a basic unit of time used by a scheduler for resource allocation. The TTI may be defined in units of one or a plurality of slots, or may be defined in units of mini-slots.

The transport channels are classified according to how and with what characteristics data are transferred over the radio interface. DL transport channels include a broadcast channel (BCH) used for transmitting system information, a downlink shared channel (DL-SCH) used for transmitting user traffic or control signals, and a paging channel (PCH) used for paging a UE. UL transport channels include an uplink shared channel (UL-SCH) for transmitting user traffic or control signals and a random access channel (RACH) normally used for initial access to a cell.

Different kinds of data transfer services are offered by MAC sublayer. Each logical channel type is defined by what type of information is transferred. Logical channels are classified into two groups: control channels and traffic channels.

Control channels are used for the transfer of control plane information only. The control channels include a broadcast control channel (BCCH), a paging control channel (PCCH), a common control channel (CCCH) and a dedicated control channel (DCCH). The BCCH is a DL channel for broadcasting system control information. The PCCH is DL channel that transfers paging information, system information change notifications. The CCCH is a channel for transmitting control information between UEs and network. This channel is used for UEs having no RRC connection with the network. The DCCH is a point-to-point bi-directional channel that transmits dedicated control information between a UE and the network. This channel is used by UEs having an RRC connection.

Traffic channels are used for the transfer of user plane information only. The traffic channels include a dedicated traffic channel (DTCH). The DTCH is a point-to-point channel, dedicated to one UE, for the transfer of user information. The DTCH can exist in both UL and DL.

Regarding mapping between the logical channels and transport channels, in DL, BCCH can be mapped to BCH, BCCH can be mapped to DL-SCH, PCCH can be mapped to PCH, CCCH can be mapped to DL-SCH, DCCH can be mapped to DL-SCH, and DTCH can be mapped to DL-SCH. In UL, CCCH can be mapped to UL-SCH, DCCH can be mapped to UL-SCH, and DTCH can be mapped to UL-SCH.

RRC connection establishment procedure is described.

The purpose of this procedure is to establish an RRC connection. RRC connection establishment involves SRB1 establishment. The procedure is also used to transfer the initial NAS dedicated information/message from the UE to the network.

The UE initiates the procedure when upper layers request establishment of an RRC connection while the UE is in RRC_IDLE.

As one UE implementation option, upper layers may request access barring check as specified in the unified access control procedure and only request the RRC establishment when the access attempt is considered allowed. As another UE implementation option, upper layers may instead provide an Access Category and one or more Access Identities upon requesting the RRC establishment so that RRC initiates the access barring check.

Upon initiation of the procedure, the UE shall:
1> if the upper layers provide an Access Category and one or more Access Identities upon requesting establishment of an RRC connection:
2> perform the unified access control procedure using the Access Category and Access Identities provided by upper layers;
3> if the access attempt is barred, the procedure ends;
1> apply the default physical channel configuration;
1> apply the default semi-persistent scheduling configuration;
1> apply the default MAC main configuration;
1> apply the CCCH configuration;
1> start timer T300;
1> initiate transmission of the RRCSetupRequest message in accordance with 5.3.3.3;

The UE shall set the contents of RRCSetupRequest message as follows:
1> set the ue-Identity as follows:
2> if upper layers provide an 5G-S-TMSI:
3> set the ue-Identity to ng-5G-s-tmsi-part1;
2> else:
2> draw a 39 bit random value in the range 0 . . . 239-1 and set the ue-Identity to this value;
Upper layers provide the 5G-S-TMSI if the UE is registered in the TA of the current cell.
1> set the establishmentCause in accordance with the information received from upper layers;

The UE shall submit the RRCSetupRequest message to lower layers for transmission.

The UE shall continue cell re-selection related measurements as well as cell re-selection evaluation. If the conditions for cell re-selection are fulfilled, the UE shall perform cell re-selection.

The UE shall perform the following actions upon reception of the RRCSetup:
1> if the RRCSetup is received in response to an RRCReestablishmentRequest; or
1> if the RRCSetup is received in response to an RRCResumeRequest:
2> discard the stored UE AS context, fullI-RNTI and shortI-RNTI, if stored;
2> indicate to upper layers fallback of the RRC connection;
1> perform the cell group configuration procedure in accordance with the received masterCellGroup;
1> perform the radio bearer configuration procedure in accordance with the received radioBearerConfig;
1> if stored, discard the cell reselection priority information provided by the cellReselectionPriorities or inherited from another RAT;
1> stop timer T300, T301 or T319 if running;
1> stop timer T320, if running;
1> if the RRCSetup is received in response to an RRCResumeRequest or RRCSetupRequest:
2> enter RRC_CONNECTED;
2> stop the cell re-selection procedure;
1> consider the current cell to be the PCell;
1> set the content of RRCSetupComplete message as follows:
2> if upper layers provide an 5G-S-TMSI:
3> if the RRCSetup is received in response to an RRC-SetupRequest:
4> set the ng-5G-S-TMSI-Value to ng-5G-s-tmsi-part2;
3> else:
4> set the ng-5G-S-TMSI-Value to ng-5g-s-tmsi;
2> set the selectedPLMN-Identity to the PLMN selected by upper layers (TS 24.501 [23]) from the PLMN(s) included in the plmn-IdentityList in SIB1;
2> if the masterCellGroupConfig contains the reportUplinkTxDirectCurrent:
3> include the uplinkTxDirectCurrentList;
2> if upper layers provide the 'Registered AMF':
3> include and set the registeredAMF as follows:
4> if the PLMN identity of the 'Registered AMF' is different from the PLMN selected by the upper layers:
5> include the plmnIdentity in the registeredAMF and set it to the value of the PLMN identity in the 'Registered AMF' received from upper layers;
4> set the amf-Region, amf-SetId, amf-Pointer to the value received from upper layers;
3> include and set the guami-Type to the value provided by the upper layers;
2> if upper layers provide one or more S-NSSAI:
3> include the s-nssai-list and set the content to the values provided by the upper layers;
2> set the dedicatedInfoNAS to include the information received from upper layers;
1> submit the RRCSetupComplete message to lower layers for transmission, upon which the procedure ends
RRC connection resume procedure is described.

The purpose of this procedure is to resume a suspended RRC connection, including resuming SRB(s) and DRB(s) or perform an RNA update.

The UE initiates the procedure when upper layers or AS (when responding to NG-RAN paging or upon triggering RNA updates while the UE is in RRC_INACTIVE) requests the resume of a suspended RRC connection.

As one UE implementation option, upper layers may request access barring check as specified in the unified access control procedure and only request the RRC resumption when the access attempt is considered allowed. As another UE implementation option, upper layers may instead provide an Access Category and one or more Access Identities upon requesting the RRC resumption so that RRC initiates the access barring check.

Upon initiation of the procedure, the UE shall:
1> if the upper layers provide an Access Category and one or more Access
Identities upon requesting the resumption of an RRC connection:
2> perform the unified access control procedure using the Access Category and
Access Identities provided by upper layers;
3> if the access attempt is barred, the procedure ends;
1> if the resumption of the RRC connection is triggered due to an RNA update:
2> if an emergency service is ongoing:
How the RRC layer in the UE is aware of an ongoing emergency service is up to UE implementation.
3> select '2' as the Access Category;
2> else:
3> select [the Access Category corresponding to RNA update] as the Access Category;
2> perform the unified access control procedure as specified in 5.3.14 using the selected Access Category and one or more Access Identities provided by upper layers;
3> if the access attempt is barred:
4> set the variable pendingRnaUpdate to 'TRUE';
4> the procedure ends;
1> if the resumption of the RRC connection is triggered by response to NG-RAN paging:

2> select '0' as the Access Category;
2> perform the unified access control procedure as specified in 5.3.14 using the selected Access Category and one or more Access Identities provided by upper layers;
3> if the access attempt is barred, the procedure ends;
1> apply the default Serving Cell configuration;
1> apply the default physical Cell Group configuration;
1> apply the default MAC Cell Group configuration;
1> apply the CCCH configuration;
1> start timer T319;
1> stop timer T380, if running;
1> initiate transmission of the RRCResumeRequest message;

The UE shall set the contents of RRCResumeRequest or RRCResumeRequest1 message as follows:
1> if field useFullResumeID is signalled in SIB1:
2> select RRCResumeRequest1 as the message to use;
2> set the resumeIdentity to the stored fulll-RNTI value;
1> else:
2> select RRCResumeRequest as the message to use;
2> set the shortResumeIdentity to the stored shortI-RNTI value;
1> set the resumeCause in accordance with the information received from upper layers or from AS layer;
1> set the resumeMAC-I to the 16 least significant bits of the MAC-I calculated:
2> over the ASN.1 encoded as per section 8 (i.e., a multiple of 8 bits) VarResumeMAC-Input;
2> with the KRRCint key and the previously configured integrity protection algorithm; and
2> with all input bits for COUNT, BEARER and DIRECTION set to binary ones;
1> restore the RRC configuration and security context from the stored UE AS context except the cellGroupConfig;
1> update the KgNB key based on the current KgNB or the NH, using the stored nextHopChainingCount value;
1> derive the KRRCenc key, the KRRCint, the KUPint key and the KUPenc key;
1> configure lower layers to resume integrity protection for all radio bearers except SRB0 using the previously configured algorithm and the KRRCint key and KUPint key immediately, i.e., integrity protection shall be applied to all subsequent messages received and sent by the UE;
Only DRBs with previously configured UP integrity protection shall resume integrity protection.
1> configure lower layers to resume ciphering for all radio bearers except SRB0 and to apply the previously configured ciphering algorithm, the KRRCenc key and the KUPenc key, i.e. the ciphering configuration shall be applied to all subsequent messages received and sent by the UE;
1> restore the PDCP state and re-establish PDCP entities for SRB1;
1> resume SRB1;
1> submit the RRCResumeRequest message to lower layers for transmission;

Unified access control is described.
The purpose of this procedure is to perform access barring check for an access attempt associated with a given Access Category and one or more Access Identities upon request from upper layers or the RRC layer.
Upon initiation of the procedure, the UE shall:
1> if timer [T30x] is running for the Access Category:
2> consider the access attempt as barred;
1> if timer T302 is running and the Access Category is neither '2' nor '0':
2> consider the access attempt as barred;
1> else:
2> if the Access Category is '0':
3> consider the access attempt as allowed;
2> else:
3> if SIB1 includes uac-BarringPerPLMN-List and the uac-BarringPerPLMN-List contains an UAC-BarringPerPLMN entry with the plmn-IdentityIndex corresponding to the PLMN selected by upper layers:
4> select the UAC-BarringPerPLMN entry with the plmn-Identity Index corresponding to the PLMN selected by upper layers;
4> in the remainder of this procedure, use the selected UAC-BarringPerPLMN entry (i.e. presence or absence of access barring parameters in this entry) irrespective of the common access barring parameters included in SIB1;
3> else
4> in the remainder of this procedure use the common access barring parameters (i.e. presence or absence of these parameters) included in SIB1;
3> if the uac-ACBarringListType indicated that uac-ExplicitACBarringList is used:
4> if the corresponding UAC-BarringPerCatList contains a UAC-BarringPerCat entry corresponding to the Access Category:
5> select the UAC-BarringPerCat entry;
5> if the uac-BarringInfoSetList contain a UAC-BarringInfoSet entry corresponding to the uac-barringInfoSet-Index in the UAC-BarringPerCat:
6> select the UAC-BarringInfoSet entry;
6> perform access barring check for the Access Category, using the UAC-BarringInfoSet as "UAC barring parameter";
5> else:
6> consider the access attempt as allowed;
4> else:
5> consider the access attempt as allowed;
3> select the UAC-BarringInfoSetIndex entry from uac-ImplicitACBarringList entry corresponding to the Access Category;
4> perform access barring check for the Access Category as specified, using uac-BarringInfo corresponding to UAC-BarringInfoSetIndex as "UAC barring parameter";
1> if the access barring check was requested by RRC for an RRC establishment or for an RRC resumption requested by upper layers; or
1> if the access barring check was requested by upper layers:
2> if the access attempt is considered as barred:
3> inform upper layers that the access attempt for the Access Category is barred, upon which the procedure ends;
2> else:
3> inform upper layers that the access attempt for the Access Category is allowed, upon which the procedure ends;
1> else:
2> the procedure ends;
Access barring check is described.
The UE shall:
1> if one or more Access Identities are indicated by upper layers or obtained by the RRC layer, and
1> if for at least one of these Access Identities the corresponding bit in the uac-BarringForAccessIdentity contained in "UAC barring parameter" is set to zero:
2> consider the access attempt as allowed;
1> else:
2> draw a random number 'rand' uniformly distributed in the range: 0≤rand<1;
2> if 'rand' is lower than the value indicated by uac-BarringFactor included in "UAC barring parameter":

3> consider the access attempt as allowed;
2> else:
3> consider the access attempt as barred;
1> if the access attempt is considered as barred:
2> draw a random number 'rand' that is uniformly distributed in the range 0≤rand<1;
2> start timer [T30x] for the Access Category with the timer value calculated as follows, using the uac-BarringTime included in "AC barring parameter": "Tbarring" =(0.7+0.6*rand)*uac-BarringTime;

Licensed-Assisted Access (LAA) is described.

Carrier aggregation with at least one SCell operating in the unlicensed spectrum is referred to as LAA. In LAA, the configured set of serving cells for a UE therefore always includes at least one SCell operating in the unlicensed spectrum according to Frame structure Type 3, also called LAA SCell. Unless otherwise specified, LAA SCells act as regular SCells.

If the absence of IEEE802.11n/11ac devices sharing the carrier cannot be guaranteed on a long term basis (e.g., by level of regulation), and for this release if the maximum number of unlicensed channels that E-UTRAN can simultaneously transmit on is equal to or less than 4, the maximum frequency separation between any two carrier center frequencies on which LAA SCell transmissions are performed should be less than or equal to 62 MHz. The UE is required to support frequency separation.

LAA eNB and UE apply Listen-Before-Talk (LBT) before performing a transmission on LAA SCell. When LBT is applied, the transmitter listens to/senses the channel to determine whether the channel is free or busy. If the channel is determined to be free, the transmitter may perform the transmission; otherwise, it does not perform the transmission. If an LAA eNB uses channel access signals of other technologies for the purpose of LAA channel access, it shall continue to meet the LAA maximum energy detection threshold requirement.

The combined time of transmissions compliant with the channel access procedure by an eNB should not exceed 50 ms in any contiguous 1 second period on an LAA SCell.

Which LBT type (i.e. type 1 or type 2 uplink channel access) the UE applies is signalled via uplink grant for uplink PUSCH transmission on LAA SCells.

For uplink LAA operation, the eNB shall not schedule the UE more subframes than the minimum necessary to transmit all the traffic corresponding to the selected Channel Access Priority Class (CAPC) or lower (i.e, with a lower number), than the:

Channel Access Priority Class signaled in UL grant based on the latest BSR and received uplink traffic from the UE if type 1 uplink channel access procedure is signalled to the UE;

Channel Access Priority Class used by the eNB based on the downlink traffic, the latest BSR and received UL traffic from the UE if type 2 uplink channel access procedure is signalled to the UE.

Four Channel Access Priority Classes are defined, which can be used when performing uplink and downlink transmissions in LAA carriers. Table 1 shows which Channel Access Priority Class should be used by traffic belonging to the different standardized QCIs. A non-standardized QCI (i.e. Operator specific QCI) should use suitable Channel Access Priority Class based on the below table, i.e. the Channel Access Priority Class used for a non-standardized QCI should be the Channel Access Priority Class of the standardized QCIs which best matches the traffic class of the non-standardized QCI.

For uplink, the eNB selects the Channel Access Priority Class by taking into account the lowest priority QCI in a Logical Channel Group.

TABLE 1

| Channel Access | QCI |
|---|---|
| 1 | 1 3 5 65 66 |
| 2 | 2 7 |
| 3 | 4 6 8 9 |
| 4 | — |

In NR-U, UE can stay in RRC_IDLE or RRC_INACTIVE on a cell in unlicensed band. Thus, UE in RRC_IDLE or RRC_INACTIVE may perform transmission of Random Access to send RRC Setup Request, RRC Resume Request or System Information Request message. Those messages may be carried on the same logical channel, i.e. CCCH. However, different UEs may have different reasons to send those messages in RACH procedure. That is, those messages may have different priories compared to each other. If CAPC applies only for a logical channel, we cannot differentiate different messages carried on the same logical channel. Therefore, it needs to apply the CAPC for control plane in NR-U, so that message with high priorities would be successfully allowed to access.

Figure 7:
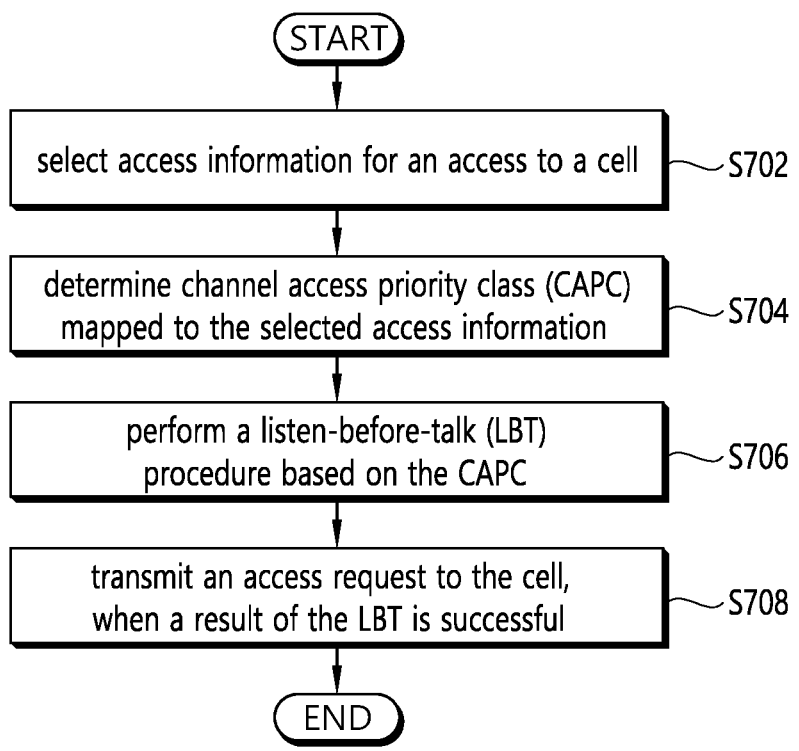
FIG. 7 shows a method for access control performed by a UE according to an embodiment of the present invention.

FIG. 7 shows a method for access control performed by a UE according to an embodiment of the present invention. In this description, the UE may be various types of wireless device, such as an integrated access and backhaul (IAB) node configured to perform the following procedure.

In step S702, the UE may select access information for an access to a cell. The access information may be selected based on access type of the access to the cell. The access information may include at least one of access class or cause value of access to the cell. After that, the UE may perform access barring check of the access based on the selected access information.

In step S704, the UE may determine channel access priority class (CAPC) mapped to the selected access information. For that, the UE may receive a mapping table from the cell. The mapping table may include information on relation between the CAPC and the access class, or between the CAPC and the cause value.

In step S706, the UE may perform a listen-before-talk (LBT) procedure based on the CAPC. The performing the LBT procedure based on the CAPC may include scaling a time duration of carrier sensing based on the CAPC. The performing the LBT procedure based on the CAPC may include scaling backoff time which is used when the result of the LBT procedure is not successful.

In step S708, the UE may transmit an access request to the cell, when a result of the LBT is successful.

The UE may communicate with at least one of a mobile terminal, a network or autonomous vehicles other than the UE.

According to embodiments of the present invention, an access by a UE in unlicensed band may be prioritized over other accesses, by performing LBT procedure based on CAPC which is mapped to the access type.

Figure 8:
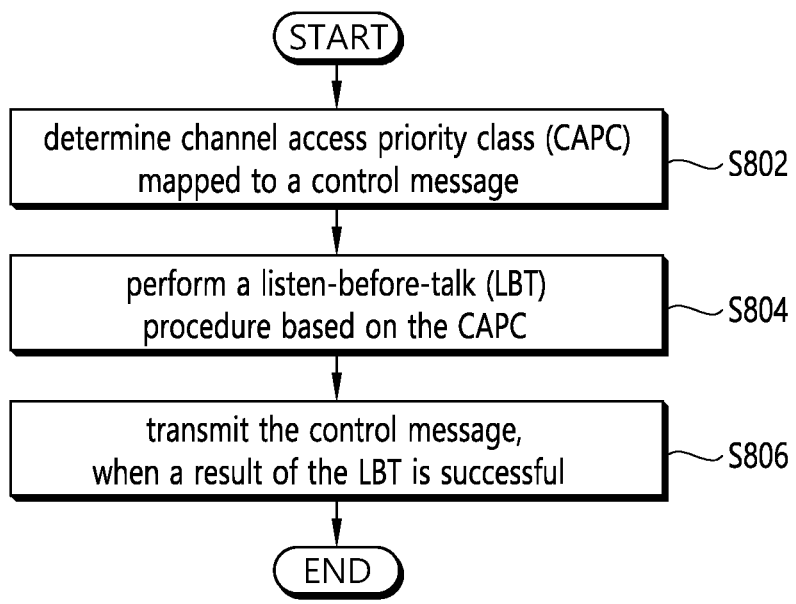
FIG. 8 shows a method for access control performed by a base station (e.g. gNB) according to an embodiment of the present invention.

FIG. 8 shows a method for access control performed by a base station (e.g. gNB) according to an embodiment of the present invention. In this description, the BS may be various types of wireless device, such as an integrated access and backhaul (IAB) node configured to perform the following procedure.

In step S802, the base station may determine channel access priority class (CAPC) mapped to a control message. The control message may include at least one of reference signal, a radio resource control (RRC) message, a non-access stratum (NAS) message, a F1AP message, a L2 control packet data unit (PDU) and a media access control (MAC) control element. The reference signal may be one of synchronization signal block (SSB) and channel state information (CSI)-reference signal (RS). The RRC message may be one of system information (SI) message, master information block (MIB) message, system information block type1 (SIB1) message, paging message, RRC setup message, RRC resume message, and RRC re-establishment message.

In step S804, the base station may perform a listen-before-talk (LBT) procedure based on the CAPC. The performing the LBT procedure based on the CAPC may include scaling a time duration of carrier sensing based on the CAPC. The performing the LBT procedure based on the CAPC may include scaling backoff time which is used when the result of the LBT procedure is not successful.

In step S806, the base station may transmit the control message, when a result of the LBT is successful.

According to embodiments of the present invention, a control message to be transmitted on unlicensed band may be prioritized, by performing LBT procedure based on CAPC which is mapped to the control message.

Figure 9:
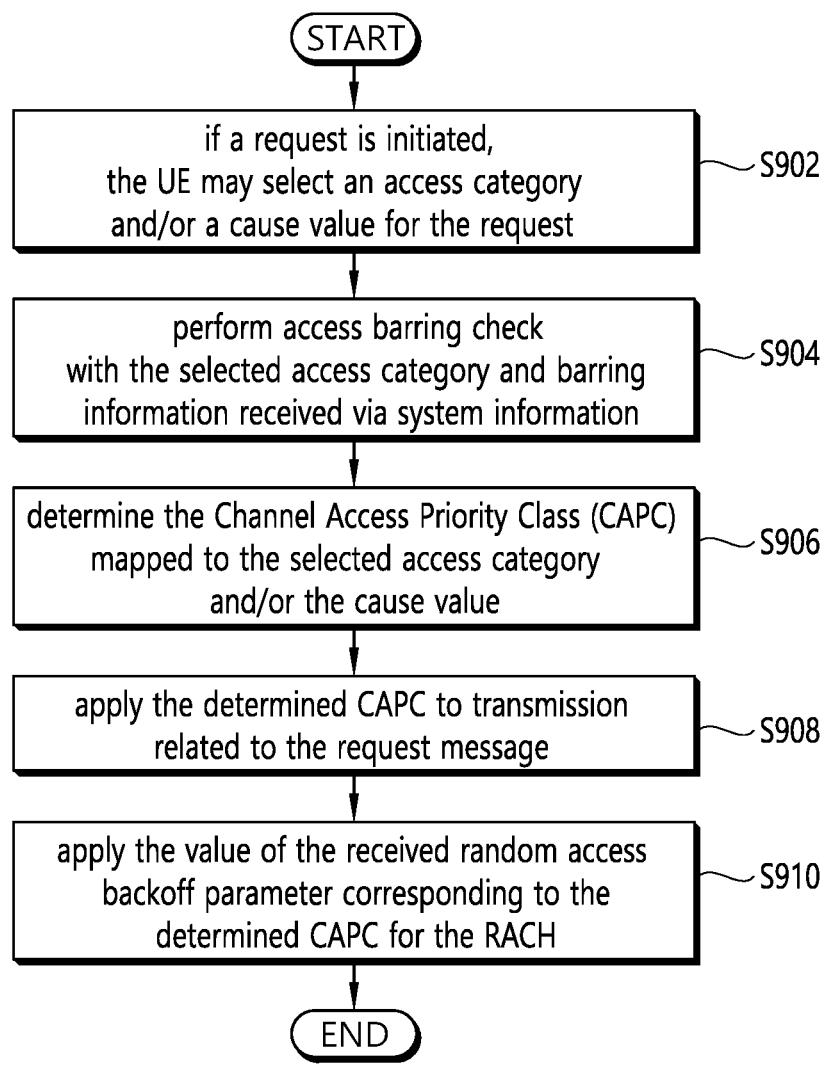
FIG. 9 shows a method for access control performed by a UE according to an embodiment of the present invention.

FIG. 9 shows a method for access control performed by a UE according to an embodiment of the present invention. In this description, the UE may be various types of wireless device, such as an integrated access and backhaul (IAB) node configured to perform the following procedure.

In step S902, if a request is initiated, the UE may select an access category and/or a cause value for the request. For example, the request may be initiated due to MO signaling, MO data, MO voice, etc.

In step S904, the UE may perform access barring check with the selected access category and barring information received via system information. If access attempt is allowed as a result of the access barring check, the UE may set the selected cause value as an establishment cause in the request message. The request message may be one of the RRC Setup Request message, the RRC Resume Request message, and the SI Request message.

In step S906, the UE may determine the Channel Access Priority Class (CAPC) mapped to the selected access category and/or the cause value. The UE may determine the CAPC based on a mapping table. The mapping table may include information on relation between the CAPCs and the access categories. The mapping table may include information on relation between the CAPCs and cause value.

In the mapping table, one or more CAPC may be mapped to an access category, or one or more access categories are mapped to one CAPC. Further, in the mapping table, one or more CAPC are mapped to a cause value, or one or more cause values are mapped to one CAPC. The UE may receive the mapping table(s) from the network e.g. via system information or UE dedicated signaling.

In step S908, the UE may apply the determined CAPC to transmission related to the request message. The transmission is at least one of RACH preamble transmission, Message 3 transmission and PUSCH transmission which are used to transmit the request message. In specific, the UE may use the determined CAPC to perform LBT for the transmission. For example, the UE may scale a time duration for channel sensing of LBT procedure based on the determined CAPC.

In step S910, when the UE receives random access backoff parameter from random access response message after transmitting a RACH preamble, and if the UE fails to receive a response to the RACH preamble, the UE may apply the value of the received random access backoff parameter corresponding to the determined CAPC for the RACH. For example, the UE may receive multiple values mapped to different CAPCs and then selects one of them to apply backoff For example, the UE may receive a value of the random access backoff parameter and then scale the received value depending on the determined CAPC.

According to embodiments of the present invention, an access by a UE in unlicensed band may be prioritized over other accesses, by performing LBT procedure based on CAPC which is mapped to the access type.

Figure 10:
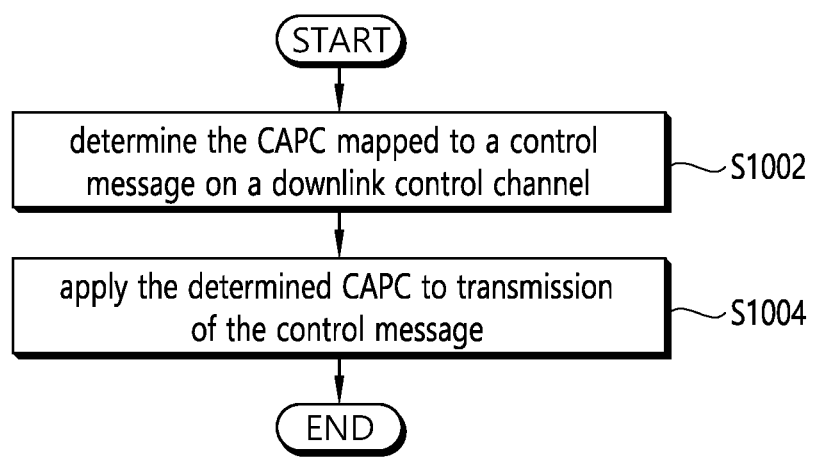
FIG. 10 shows a method for access control performed by a base station (e.g. gNB) according to an embodiment of the present invention.

FIG. 10 shows a method for access control performed by a base station (e.g. gNB) according to an embodiment of the present invention. In this description, the BS may be various types of wireless device, such as an integrated access and backhaul (IAB) node configured to perform the following procedure.

In step S1002, the base station may determine the CAPC mapped to a control message on a downlink control channel. The downlink control channel may be one of BCCH, PCCH, CCCH and DCCH. The control message may be one of a reference signal, a RRC message, a NAS message, a F1AP message, a L2 Control PDU and a MAC Control Element. If the control message is a RRC message, it may be one of system information message, MIB message, SIB1 message, paging message, RRC setup message, RRC resume message, and RRC reestablishment message. If the control message is a reference signal, it may be one of SS blocks (SSB) and CSI-RS.

The base station may use a mapping table between the CAPCs and the control message to determine the CAPC. In the mapping table, one or more CAPCs are mapped to a control message, or one or more control messages are mapped to one CAPC. For example, different RRC messages may be mapped to different CAPCs. For example, a reference signal, a RRC message, a NAS message, a F1AP message, a L2 Control PDU and a MAC control element may be mapped to different CAPCs. For example, different types of reference signals such as SS blocks and CSI-RS may be mapped to different CAPCs from each other.

According to an embodiment of the present invention, the gNB may be either CU or DU. The DU of the gNB may receive the mapping table(s) from the CU of the gNB e.g. via system information or UE dedicated signaling. Then, the DU of the gNB may determine the CAPC based on the mapping table.

In step S1004, the base station may apply the determined CAPC to transmission of the control message. In specific, the base station may perform LBT procedure based on the CAPC, before transmitting the control message. When the result of the LBT procedure is successful, the base station may transmit the control message to the UE.

According to embodiments of the present invention, a control message to be transmitted on unlicensed band may be prioritized, by performing LBT procedure based on CAPC which is mapped to the control message.

Figure 11:
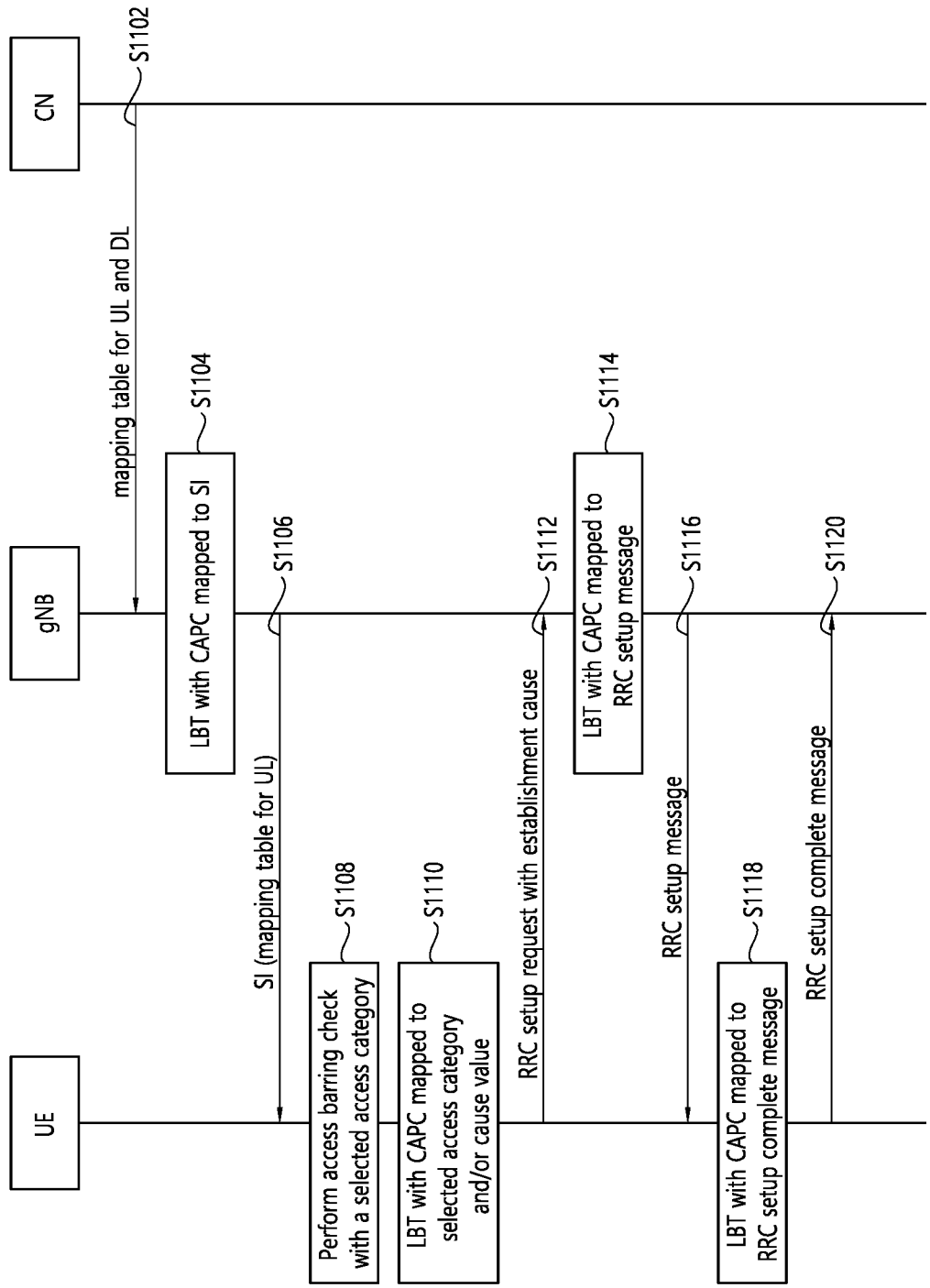
FIG. 11 shows a method for access control according to an embodiment of the present invention.

FIG. 11 shows a method for access control according to an embodiment of the present invention. In this embodiment, a base station (BS) may be gNB, and the gNB may be either CU or DU. Further, the BS and the UE may be various types of wireless device, such as an integrated access and backhaul (IAB) node configured to perform the following procedure.

In step S1102, the BS may receive the mapping table between the CAPCs and downlink/uplink transmissions to determine the CAPC. The mapping table may include mapping table for DL and mapping table for UL. The mapping table may be provided by a core network.

In the mapping table for DL, one or more CAPCs may be mapped to a control message, or one or more control messages may be mapped to one CAPC. For example, the control message may be one of a reference signal, a RRC message, a NAS message, a F1AP message, a L2 Control PDU and a MAC control element. If the control message is a RRC message, it may be one of system information message, MIB message, SIB1 message, paging message, RRC setup message, RRC resume message, and RRC reestablishment message. If the control message is a reference signal, it may be one of SS blocks (SSB) and CSI-RS.

In the mapping table for UL, one or more CAPCs may be mapped to an access category (or a cause value), or one or more access categories (or cause values) may be mapped to one CAPC. For example, different RRC messages may be mapped to different CAPCs. For example, a reference signal, a RRC message, a NAS message, a F1AP message, a L2 Control PDU and a MAC control element are mapped to different CAPCs.

In step S1104, the base station may perform LBT based on CAPC to provide the mapping table to the UE. The mapping table may be delivered by SI message, the base station may apply the CAPC mapped to SI message to perform LBT.

In step S1106, the base station may transmit the mapping table(s) to the UE. The base station may transmit mapping table for UL. In specific, if LBT is not failed, base station may transmit the SI message including the mapping table. If the LBT is failed, the base station may wait to transmit for specific time duration. The time duration may be scaled based on CAPC mapped to the SI message. The mapping table may be provided via system information or UE dedicated signaling.

In step S1108, if a request is initiated e.g. due to paging, MO signaling, MO data, MO voice, etc, the UE may select an access category and/or a cause value (which are/is mapped to one of paging, MO signaling, MO data, MO voice, etc) for the request. Then, the UE may perform Access Barring Check with the selected access category and barring information. The barring information may be transmitted via system information.

In case that the request is initiated due to paging, the base station may perform LBT for paging in advance. That is, the base station may select CAPC mapped to a paging, and perform LBT based on the selected CAPC. When the result of LBT is successful, the base station may perform paging to the UE. After receiving paging from the base station, the UE may select an access category and/or a cause value, as described in step S1108.

In step S1110, if access attempt is allowed as a result of the access barring check, the UE may set the selected cause value in the RRC Setup Request message. Then, the UE may perform LBT with CAPC mapped to the selected access category or a selected establishment cause value.

In specific, the UE may determine the CAPC mapped to the selected access category and/or the selected cause value. The UE may use the mapping table between the CAPCs and the access categories to determine the CAPC. In the mapping table, one or more CAPCs may be mapped to an access category, or one or more access categories are mapped to one CAPC. The UE may use the mapping table between the CAPCs and the cause values to determine the CAPC.

In step S1112, if LBT is not failed, the UE may initiate RACH procedure. The UE may transmit RACH preamble and the RRC setup request message including establishment cause.

During the RACH procedure, if the UE receives random access backoff parameter from random access response message after transmitting a RACH preamble, and if the UE fails to receive a response to the RACH preamble, the UE may apply the value of the received random access backoff parameter corresponding to the determined CAPC for the RACH. For example, the UE may receive multiple values mapped to different CAPCs and then select one of them to apply backoff. The UE may delay preamble transmission according to the selected value. For example, the UE may receive a value of the random access backoff parameter and then scale the received value depending on the determined CAPC. The UE delays preamble transmission according to the scaled value.

If the LBT is failed in step S1110, the UE would wait to transmit.

In step S1114, the base station may perform LBT with CAPC to transmit RRC setup message on CCCH. The base station may select CAPC mapped to the RRC setup message or CCCH.

In step S1116, the base station may transmit RRC setup message, when the LBT is successful.

In step S1118, when the UE receives RRC setup message, the UE may perform LBT with CAPC to transmit RRC setup complete message on DCCH. The UE may select CAPC for LBT mapped to the RRC setup complete message or DCCH or SRB1.

In step S1120, if LBT is not failed, UE may transmit a RRC Setup Complete message. If the LBT is failed, UE would wait to transmit.

According to embodiments of the present invention, the LBT procedure may be performed based on CAPC, which is mapped to access type or control message. Therefore, priority of access and/or control message may be reflected on control plane when data transmission is occurred on unlicensed band.

Figure 12:
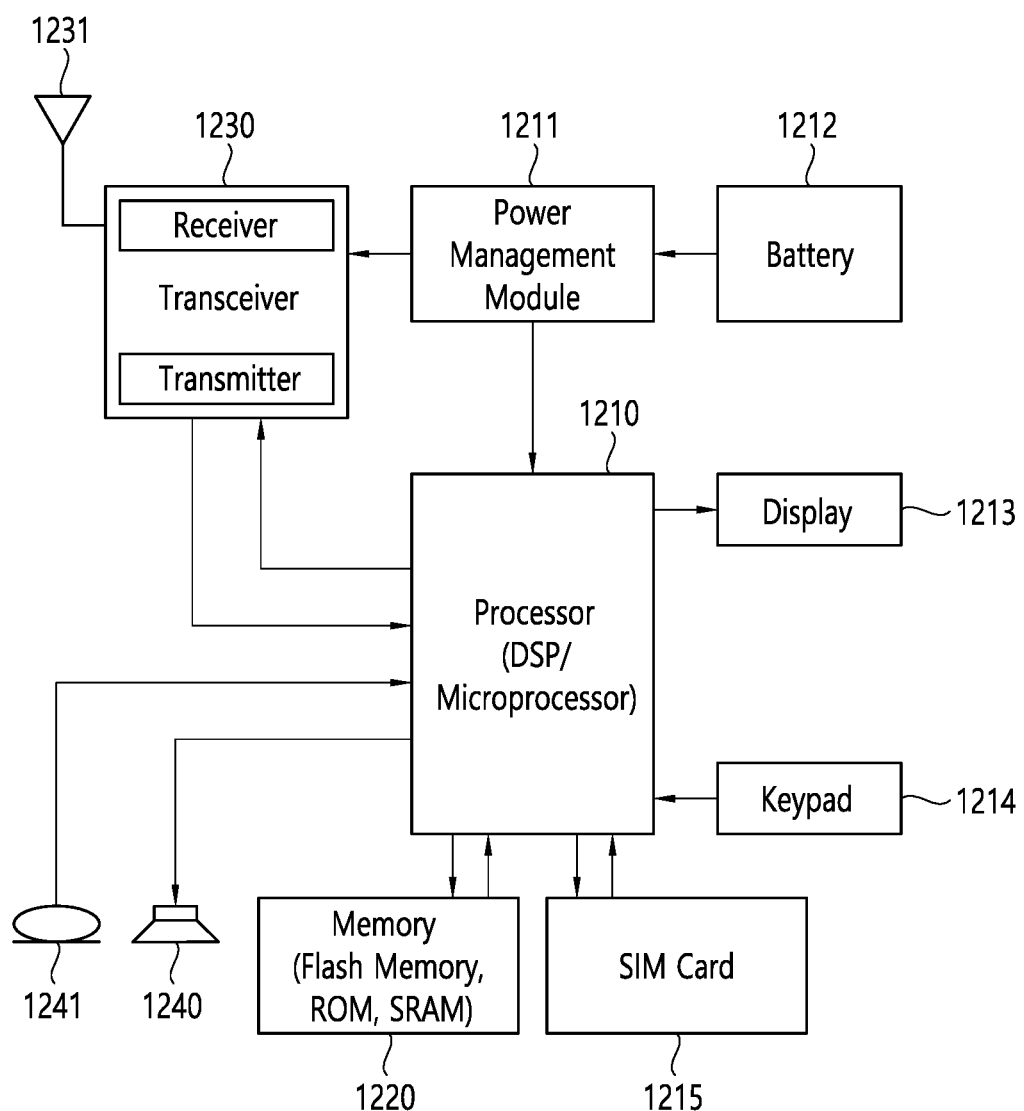
FIG. 12 shows more detailed UE to implement an embodiment of the present invention.

FIG. 12 shows more detailed UE to implement an embodiment of the present invention. The present invention described above for UE side may be applied to this embodiment.

A UE includes a processor 1210, a power management module 1111, a battery 1212, a display 1213, a keypad 1214, a subscriber identification module (SIM) card 1215, a memory 1220, a transceiver 1230, one or more antennas 1231, a speaker 1240, and a microphone 1241.

The processor 1210 may be configured to implement proposed functions, procedures and/or methods described in this description. Layers of the radio interface protocol may be implemented in the processor 1210. The processor 1210 may include ASIC, other chipset, logic circuit and/or data processing device. The processor 1210 may be an application processor (AP). The processor 1210 may include at least one of a digital signal processor (DSP), a central processing unit (CPU), a graphics processing unit (GPU), a modem (modulator and demodulator). An example of the processor 1210 may be found in SNAPDRAGON™ series of processors made by Qualcomm®, EXYNOS™ series of processors made by Samsung®, A series of processors made by Apple®, HELIO™ series of processors made by MediaTek®, ATOM™ series of processors made by Intel® or a corresponding next generation processor.

According to an embodiment of the present invention, the processor 1210 may be configured to select access information for an access to a cell. The access information may be selected based on access type of the access to the cell. The access information may include at least one of access class or cause value of access to the cell. After that, the UE may perform access barring check of the access based on the selected access information.

The processor 1210 may be configured to determine channel access priority class (CAPC) mapped to the selected access information. For that, the processor 1210 may receive a mapping table from the cell. The mapping table may include information on relation between the CAPC and the access class, or between the CAPC and the cause value.

The processor 1210 may be configured to perform a listen-before-talk (LBT) procedure based on the CAPC. The performing the LBT procedure based on the CAPC may include scaling a time duration of carrier sensing based on the CAPC. The performing the LBT procedure based on the CAPC may include scaling backoff time which is used when the result of the LBT procedure is not successful.

The processor 1210 may be configured to transmit an access request to the cell, when a result of the LBT is successful.

The processor 1210 may be configured to communicate with at least one of a mobile terminal, a network or autonomous vehicles other than the UE.

According to embodiments of the present invention, an access by a UE in unlicensed band may be prioritized over other accesses, by performing LBT procedure based on CAPC which is mapped to the access type.

According to another embodiment of the present invention, the processor 1210 may be configured to determine channel access priority class (CAPC) mapped to a control message. The control message may include at least one of reference signal, a radio resource control (RRC) message, a non-access stratum (NAS) message, a F1AP message, a L2 control packet data unit (PDU) and a media access control (MAC) control element. The reference signal may be one of synchronization signal block (SSB) and channel state information (CSI)-reference signal (RS). The RRC message may be one of system information (SI) message, master information block (MIB) message, system information block type1 (SIB1) message, paging message, RRC setup message, RRC resume message, and RRC re-establishment message.

The processor 1210 may be configured to perform a listen-before-talk (LBT) procedure based on the CAPC. The performing the LBT procedure based on the CAPC may include scaling a time duration of carrier sensing based on the CAPC. The performing the LBT procedure based on the CAPC may include scaling backoff time which is used when the result of the LBT procedure is not successful.

The processor 1210 may be configured to transmit the control message, when a result of the LBT is successful.

According to embodiments of the present invention, a control message to be transmitted on unlicensed band may be prioritized, by performing LBT procedure based on CAPC which is mapped to the control message.

The power management module 1211 manages power for the processor 1210 and/or the transceiver 1230. The battery 1212 supplies power to the power management module 1211. The display 1213 outputs results processed by the processor 1210. The keypad 1214 receives inputs to be used by the processor 1210. The keypad 1214 may be shown on the display 1213. The SIM card 1215 is an integrated circuit that is intended to securely store the international mobile subscriber identity (IMSI) number and its related key, which are used to identify and authenticate subscribers on mobile telephony devices (such as mobile phones and computers). It is also possible to store contact information on many SIM cards.

The memory 1220 is operatively coupled with the processor 1210 and stores a variety of information to operate the processor 1210. The memory 1220 may include ROM, RAM, flash memory, memory card, storage medium and/or other storage device. When the embodiments are implemented in software, the techniques described herein can be implemented with modules (e.g., procedures, functions, and so on) that perform the functions described herein. The modules can be stored in the memory 1220 and executed by the processor 1210. The memory 1220 can be implemented within the processor 1210 or external to the processor 1210 in which case those can be communicatively coupled to the processor 1210 via various means as is known in the art.

The transceiver 1230 is operatively coupled with the processor 1210, and transmits and/or receives a radio signal. The transceiver 1230 includes a transmitter and a receiver. The transceiver 1230 may include baseband circuitry to process radio frequency signals. The transceiver 1230 controls the one or more antennas 1231 to transmit and/or receive a radio signal.

The speaker 1240 outputs sound-related results processed by the processor 1210. The microphone 1241 receives sound-related inputs to be used by the processor 1210.

The present invention may be applied to various future technologies, such as AI, robots, autonomous-driving/self-driving vehicles, and/or extended reality (XR).

AI refers to artificial intelligence and/or the field of studying methodology for making it. Machine learning is a field of studying methodologies that define and solve various problems dealt with in AI. Machine learning may be defined as an algorithm that enhances the performance of a task through a steady experience with any task.

An artificial neural network (ANN) is a model used in machine learning. It can mean a whole model of problem-solving ability, consisting of artificial neurons (nodes) that form a network of synapses. An ANN can be defined by a connection pattern between neurons in different layers, a learning process for updating model parameters, and/or an activation function for generating an output value. An ANN may include an input layer, an output layer, and optionally one or more hidden layers. Each layer may contain one or more neurons, and an ANN may include a synapse that links neurons to neurons. In an ANN, each neuron can output a summation of the activation function for input signals, weights, and deflections input through the synapse. Model parameters are parameters determined through learning, including deflection of neurons and/or weights of synaptic connections. The hyper-parameter means a parameter to be set in the machine learning algorithm before learning, and includes a learning rate, a repetition number, a mini batch size, an initialization function, etc. The objective of the ANN learning can be seen as determining the model parameters that minimize the loss function. The loss function can be used as an index to determine optimal model parameters in learning process of ANN.

Machine learning can be divided into supervised learning, unsupervised learning, and reinforcement learning, depending on the learning method. Supervised learning is a method of learning ANN with labels given to learning data. Labels are the answers (or result values) that ANN must infer when learning data is input to ANN. Unsupervised learning can mean a method of learning ANN without labels given to learning data. Reinforcement learning can mean a learning method in which an agent defined in an environment learns to select a behavior and/or sequence of actions that maximizes cumulative compensation in each state.

Machine learning, which is implemented as a deep neural network (DNN) that includes multiple hidden layers among ANN, is also called deep learning. Deep learning is part of machine learning. In the following, machine learning is used to mean deep learning.

A robot can mean a machine that automatically processes or operates a given task by its own abilities. In particular, a robot having a function of recognizing the environment and performing self-determination and operation can be referred to as an intelligent robot. Robots can be classified into industrial, medical, household, military, etc., depending on the purpose and field of use. The robot may include a driving unit including an actuator and/or a motor to perform various physical operations such as moving a robot joint. In addition, the movable robot may include a wheel, a break, a propeller, etc., in a driving unit, and can travel on the ground or fly in the air through the driving unit.

The autonomous-driving refers to a technique of self-driving, and an autonomous vehicle refers to a vehicle that travels without a user's operation or with a minimum operation of a user. For example, autonomous-driving may include techniques for maintaining a lane while driving, techniques for automatically controlling speed such as adaptive cruise control, techniques for automatically traveling along a predetermined route, and techniques for traveling by setting a route automatically when a destination is set. The autonomous vehicle may include a vehicle having only an internal combustion engine, a hybrid vehicle having an internal combustion engine and an electric motor together, and an electric vehicle having only an electric motor, and may include not only an automobile but also a train, a motorcycle, etc. The autonomous vehicle can be regarded as a robot having an autonomous driving function.

XR are collectively referred to as VR, AR, and MR. VR technology provides real-world objects and/or backgrounds only as computer graphic (CG) images, AR technology provides CG images that is virtually created on real object images, and MR technology is a computer graphics technology that mixes and combines virtual objects in the real world. MR technology is similar to AR technology in that it shows real and virtual objects together. However, in the AR technology, the virtual object is used as a complement to the real object, whereas in the MR technology, the virtual object and the real object are used in an equal manner. XR technology can be applied to HMD, head-up display (HUD), mobile phone, tablet PC, laptop, desktop, TV, digital signage. A device to which the XR technology is applied may be referred to as an XR device.

Figure 13:
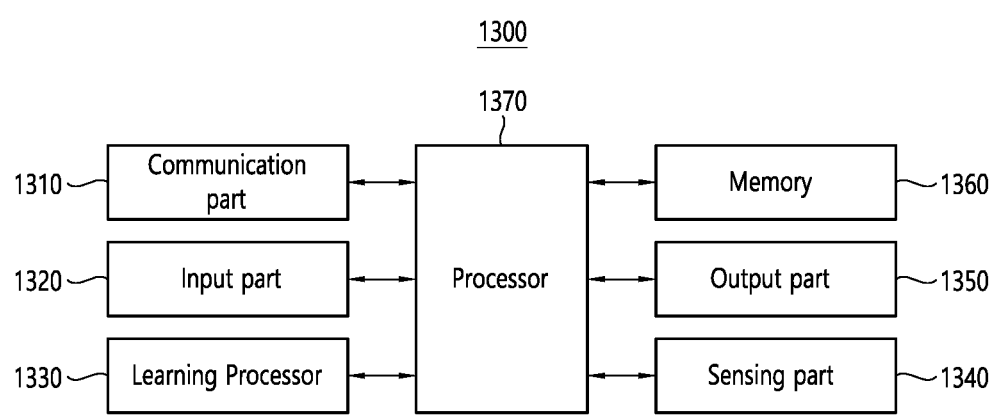
FIG. 13 shows an example of an AI device to which the technical features of the present invention can be applied.

FIG. 13 shows an example of an AI device to which the technical features of the present invention can be applied.

The AI device 1300 may be implemented as a stationary device or a mobile device, such as a TV, a projector, a mobile phone, a smartphone, a desktop computer, a notebook, a digital broadcasting terminal, a PDA, a PMP, a navigation device, a tablet PC, a wearable device, a set-top box (STB), a digital multimedia broadcasting (DMB) receiver, a radio, a washing machine, a refrigerator, a digital signage, a robot, a vehicle, etc.

Referring to FIG. 13, the AI device 1300 may include a communication part 1310, an input part 1320, a learning processor 1330, a sensing part 1340, an output part 1350, a memory 1360, and a processor 1370.

The communication part 1310 can transmit and/or receive data to and/or from external devices such as the AI devices and the AI server using wire and/or wireless communication technology. For example, the communication part 1310 can transmit and/or receive sensor information, a user input, a learning model, and a control signal with external devices. The communication technology used by the communication part 1310 may include a global system for mobile communication (GSM), a code division multiple access (CDMA), an LTE/LTE-A, a 5G, a WLAN, a Wi-Fi, Bluetooth™, radio frequency identification (RFID), infrared data association (IrDA), ZigBee, and/or near field communication (NFC).

The input part 1320 can acquire various kinds of data. The input part 1320 may include a camera for inputting a video signal, a microphone for receiving an audio signal, and a user input part for receiving information from a user. A camera and/or a microphone may be treated as a sensor, and a signal obtained from a camera and/or a microphone may be referred to as sensing data and/or sensor information. The input part 1320 can acquire input data to be used when acquiring an output using learning data and a learning model for model learning. The input part 1320 may obtain raw input data, in which case the processor 1370 or the learning processor 1330 may extract input features by preprocessing the input data.

The learning processor 1330 may learn a model composed of an ANN using learning data. The learned ANN can be referred to as a learning model. The learning model can be used to infer result values for new input data rather than learning data, and the inferred values can be used as a basis for determining which actions to perform. The learning processor 1330 may perform AI processing together with the learning processor of the AI server. The learning processor 1330 may include a memory integrated and/or implemented in the AI device 1300. Alternatively, the learning processor 1330 may be implemented using the memory 1360, an external memory directly coupled to the AI device 1300, and/or a memory maintained in an external device.

The sensing part 1340 may acquire at least one of internal information of the AI device 1300, environment information of the AI device 1300, and/or the user information using various sensors. The sensors included in the sensing part 1340 may include a proximity sensor, an illuminance sensor, an acceleration sensor, a magnetic sensor, a gyro sensor, an inertial sensor, an RGB sensor, an IR sensor, a fingerprint recognition sensor, an ultrasonic sensor, an optical sensor, a microphone, a light detection and ranging (LIDAR), and/or a radar.

The output part 1350 may generate an output related to visual, auditory, tactile, etc. The output part 1350 may include a display unit for outputting visual information, a speaker for outputting auditory information, and/or a haptic module for outputting tactile information.

The memory 1360 may store data that supports various functions of the AI device 1300. For example, the memory 1360 may store input data acquired by the input part 1320, learning data, a learning model, a learning history, etc.

The processor 1370 may determine at least one executable operation of the AI device 1300 based on information determined and/or generated using a data analysis algorithm and/or a machine learning algorithm. The processor 1370 may then control the components of the AI device 1300 to perform the determined operation. The processor 1370 may request, retrieve, receive, and/or utilize data in the learning processor 1330 and/or the memory 1360, and may control the components of the AI device 1300 to execute the predicted operation and/or the operation determined to be desirable among the at least one executable operation. The processor 1370 may generate a control signal for controlling the external device, and may transmit the generated control signal to the external device, when the external device needs to be linked to perform the determined operation. The processor 1370 may obtain the intention information for the user input and determine the user's requirements based on the obtained intention information. The processor 1370 may use at least one of a speech-to-text (STT) engine for converting speech input into a text string and/or a natural language processing (NLP) engine for acquiring intention information of a natural language, to obtain the intention information corresponding to the user input. At least one of the STT engine and/or the NLP engine may be configured as an ANN, at least a part of which is learned according to a machine learning algorithm. At least one of the STT engine and/or the NLP engine may be learned by the learning processor 1330 and/or learned by the learning processor of the AI server, and/or learned by their distributed processing. The processor 1370 may collect history information including the operation contents of the AI device 1300 and/or the user's feedback on the operation, etc. The processor 1370 may store the collected history information in the memory 1360 and/or the learning processor 1330, and/or transmit to an external device such as the AI server. The collected history information can be used to update the learning model. The processor 1370 may control at least some of the components of AI device 1300 to drive an application program stored in memory 1360. Furthermore, the processor 1370 may operate two or more of the components included in the AI device 1300 in combination with each other for driving the application program.

Figure 14:
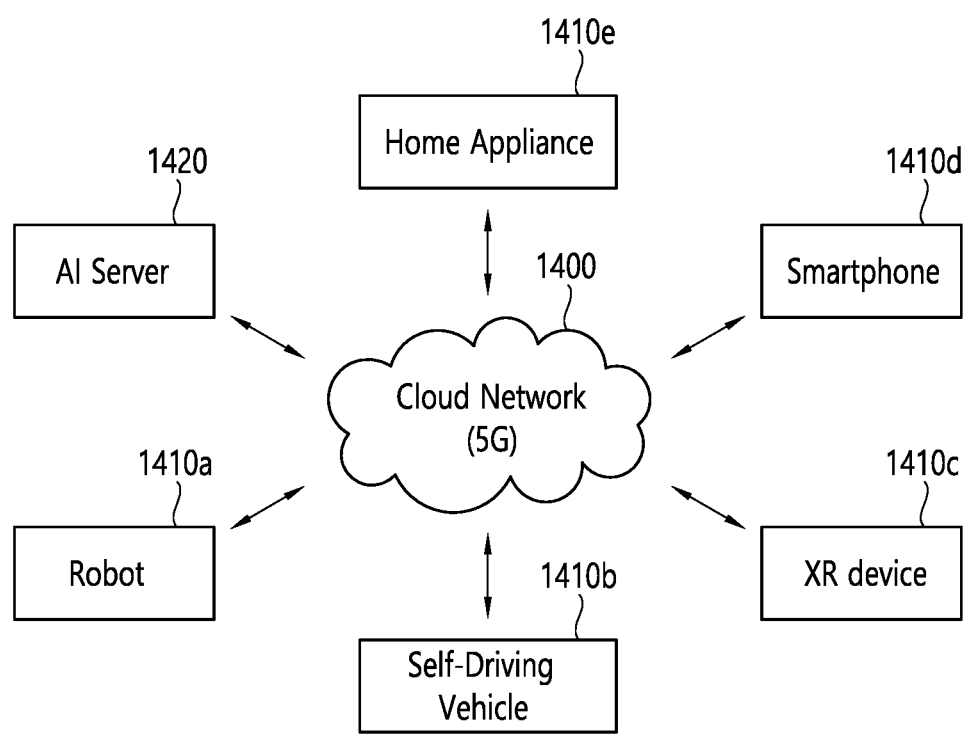
FIG. 14 shows an example of an AI system to which the technical features of the present invention can be applied.

FIG. 14 shows an example of an AI system to which the technical features of the present invention can be applied.

Referring to FIG. 14, in the AI system, at least one of an AI server 1420, a robot 1410*a*, an autonomous vehicle 1410*b*, an XR device 1410*c*, a smartphone 1410*d* and/or a home appliance 1410*e* is connected to a cloud network 1400. The robot 1410*a*, the autonomous vehicle 1410*b*, the XR device 1410*c*, the smartphone 1410*d*, and/or the home appliance 1410*e* to which the AI technology is applied may be referred to as AI devices 1410*a* to 1410*e*.

The cloud network 1400 may refer to a network that forms part of a cloud computing infrastructure and/or resides in a cloud computing infrastructure. The cloud network 1400 may be configured using a 3G network, a 4G or LTE network, and/or a 5G network. That is, each of the devices 1410*a* to 1410*e* and 1420 consisting the AI system may be connected to each other through the cloud network 1400. In particular, each of the devices 1410*a* to 1410*e* and 1420 may communicate with each other through a base station, but may directly communicate with each other without using a base station.

The AI server 1400 may include a server for performing AI processing and a server for performing operations on big data. The AI server 1400 is connected to at least one or more of AI devices constituting the AI system, i.e. the robot 1410*a*, the autonomous vehicle 1410*b*, the XR device 1410*c*, the smartphone 1410*d* and/or the home appliance 1410*e* through the cloud network 1400, and may assist at least some AI processing of the connected AI devices 1410*a* to 1410*e*. The AI server 1400 can learn the ANN according to the machine learning algorithm on behalf of the AI devices 1410*a* to 1410*e*, and can directly store the learning models and/or transmit them to the AI devices 1410*a* to 1410*e*. The AI server 1400 may receive the input data from the AI devices 1410*a* to 1410*e*, infer the result value with respect to the received input data using the learning model, generate a response and/or a control command based on the inferred result value, and transmit the generated data to the AI devices 1410*a* to 1410*e*. Alternatively, the AI devices 1410*a* to 1410*e* may directly infer a result value for the input data using a learning model, and generate a response and/or a control command based on the inferred result value.

Various embodiments of the AI devices 1410*a* to 1410*e* to which the technical features of the present invention can be applied will be described. The AI devices 1410*a* to 1410*e* shown in FIG. 14 can be seen as specific embodiments of the AI device 1300 shown in FIG. 13.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope of the present disclosure.

What has been described above includes examples of the various aspects. It is, of course, not possible to describe every conceivable combination of components or methodologies for purposes of describing the various aspects, but one of ordinary skill in the art may recognize that many further combinations and permutations are possible. Accordingly, the subject specification is intended to embrace all such alternations, modifications and variations that fall within the scope of the appended claims.

Claims in the present description can be combined in a various way. For instance, technical features in method claims of the present description can be combined to be implemented or performed in an apparatus, and technical features in apparatus claims can be combined to be implemented or performed in a method. Further, technical features in method claim(s) and apparatus claim(s) can be combined to be implemented or performed in an apparatus. Further, technical features in method claim(s) and apparatus claim(s) can be combined to be implemented or performed in a method.

What is claimed is:

1. A method performed by a wireless device configured to operate in a wireless communication system, the method comprising:

receiving, from a network, barring information via system information;

selecting access information associated with an access attempt, wherein the access information includes an access category and a cause;

performing a unified access control procedure based on the access category and the barring information;

based on the access attempt being allowed as a result of the unified access control procedure, setting the cause in a request message for the access attempt;

determining a channel access priority class (CAPC) mapped to at least one of the access category or the cause;

applying the CAPC to transmission related to the request message;

performing a listen-before-talk (LBT) procedure based on the CAPC; and based on a result of the LBT being successful, transmitting, to the network, the request message for the access attempt.

2. The method of claim 1, wherein the access information is selected based on access type of the access attempt.

3. The method of claim 1, further comprising: receiving a mapping table from the network,
wherein the mapping table includes information on relation between the CAPC and the access category, or between the CAPC and the cause .

4. The method of claim 1, wherein the performing the LBT procedure based on the CAPC includes scaling a time duration of carrier sensing based on the CAPC.

5. The method of claim 1, wherein the performing the LBT procedure based on the CAPC includes scaling backoff time based on the CAPC.

6. The method of claim 1, wherein the wireless device communicates with at least one of a mobile terminal, a network or autonomous vehicles other than the wireless device.

7. A processing apparatus configured to control a wireless device in a wireless communication system, the processing apparatus comprising:
at least one processor; and
at least one memory operably connectable to the at least one processor,
wherein the at least one processor is configured to perform operations comprising:
obtaining barring information via system information;
selecting access information associated with an access attempt, wherein the access information includes an access category and a cause;
performing a unified access control procedure based on the access category and the barring information;
based on the access attempt being allowed as a result of the unified access control procedure, setting the cause in a request message for the access attempt;
determining a channel access priority class (CAPC) mapped to at least one of the selected access category or the cause;
performing a listen-before-talk (LBT) procedure based on the CAPC; and
based on a result of the LBT being successful, controlling the wireless device to transmit the request message for the access attempt.

8. A wireless device configured to operate in a wireless communication system, the wireless device comprising:
at least one transceiver;
at least one processor; and
at least one memory operably connectable to the at least one processor and storing instructions that, based on being executed by the at least one processor, perform operations comprising:
receiving, from a network via the at least one transceiver, barring information via system information;
selecting access information associated with an access attempt, wherein the access information includes an access category and a cause;
performing a unified access control procedure based on the access category and the barring information;
based on the access attempt being allowed as a result of the unified access control procedure, setting the cause in a request message for the access attempt;
determining a channel access priority class (CAPC) mapped to at least one of the access category or the cause;
applying the CAPC to transmission related to the request message;
performing a listen-before-talk (LBT) procedure based on the CAPC; and
based on a result of the LBT being successful, transmitting, to the network via the at least one transceiver, the request message for the access attempt.

* * * * *